United States Patent [19]

Ozawa et al.

[11] Patent Number: 5,113,277
[45] Date of Patent: May 12, 1992

[54] FIBER OPTIC DISTRIBUTED TEMPERATURE SENSOR SYSTEM

[75] Inventors: Yasuo Ozawa, Odawara; Nobuo Ando, Hitachi; Satoshi Yamamoto, Hitachi; Toshio Fukahori, Hitachi; Hiroyuki Kunugiyama, Hitachi; Kouichi Sugiyama, Takahagi; Teruaki Tsutsui, Hitachi; Keiichi Hashiba, Hitachi; Shigehiro Endoh, Hitachi; Hiroshi Kawakami, Hitachi; Akira Tokushima, Hitachi; Kaoru Yamazaki, Kita-Ibaraki, all of Japan

[73] Assignees: Hitachi Cable Limited; The Tokyo Electric Power Company, Incorporated, both of Tokyo, Japan

[21] Appl. No.: 542,610

[22] Filed: Jun. 22, 1990

[30] Foreign Application Priority Data

Jun. 22, 1989 [JP] Japan .................. 1-158256

[51] Int. Cl.⁵ .............................. H04J 14/02
[52] U.S. Cl. .............................. 359/127
[58] Field of Search .......... 73/338.3, 338; 374/161, 374/121, 123, 124, 127, 131; 356/44, 73.1, 301, 306; 250/227, 340; 350/96.20; 370/3; 359/127

[56] References Cited

U.S. PATENT DOCUMENTS

| | | | |
|---|---|---|---|
| 3,802,777 | 4/1974 | Regnier et al. | 356/318 X |
| 4,244,045 | 1/1981 | Nosu | 370/3 |
| 4,313,344 | 2/1982 | Brogardh et al. | 374/131 X |
| 4,397,314 | 8/1983 | Vaguine | 374/122 X |
| 4,482,994 | 11/1984 | Ishikawa | 370/3 |
| 4,673,299 | 6/1987 | Dakin | 374/131 |
| 4,702,551 | 10/1987 | Coulombe | 350/96.20 |
| 4,703,175 | 10/1987 | Salour et al. | 374/161 X |
| 4,741,588 | 5/1988 | Nicia | 370/3 |
| 4,765,708 | 8/1988 | Becker et al. | 350/96.20 |
| 4,767,219 | 8/1988 | Bibby | 374/123 |
| 4,823,166 | 4/1989 | Hartog et al. | 374/131 |

FOREIGN PATENT DOCUMENTS 140031  6/1989  Japan ...................... 374/131

Primary Examiner—Curtis Kuntz
Assistant Examiner—L. Pascal
Attorney, Agent, or Firm—Dykema Gossett

[57] ABSTRACT

A fiber optic distributed temperature sensor system outputs a temperature distribution along the longitudinal direction of a sensor optical fiber by measuring the temperature dependency of Raman scattered light intensity produced in an optical fiber by use of the OTDR technique. The system is characterized in that a light output from a light source is input to the sensor (optical fiber) via an optical wavelength division demultiplexer, that among the reflected light of back scattered light returning from the sensor optical fiber, light of a particular wavelength range is reflected or transmitted by at least one optical filter of the optical wavelength division demultiplexer to separate the light of the particular wavelength range and that signal of the light of the particular wavelength range is guided to a detector of an optical measuring system.

11 Claims, 31 Drawing Sheets

FIG.11

| EMBODIMENT NO. | BASIC EMBODEMENT NO. | FILTER | | | | |
|---|---|---|---|---|---|---|
| | | F1 | F2 | F3 | F4 | F5 |
| 5 | 1 (FIGURE 2) | c | c | $a^x$ OR b | a OR $b^x$ OR c | — |
| 6 | 2 (FIGURE 7) | c | c | d OR $e^x$ OR e | c OR $d^x$ OR e | — |
| 7 | 3 (FIGURE 8,9) | c | c | $a^x$ OR b | a OR $b^x$ OR c | e |
| 8 | 4 | c | c | d OR $e^x$ | c OR $d^x$ OR e | a |

FIG.17

| EMBODIMENT NO. | BASIC EMBODEMENT NO. | FILTER | | | | | |
|---|---|---|---|---|---|---|---|
| | | F11 | F12 | F13 | F14 | F15 | F16 |
| 13 | 9 (FIGURE 12) | $b^x$ OR c | c OR $d^x$ | a OR $b^x$ OR c | c OR $d^x$ OR e | — | — |
| 14 | 10 (FIGURE 14) | c OR $d^x$ | $b^x$ OR c | c OR $d^x$ OR e | a OR $b^x$ OR c | — | — |
| 15 | 11 (FIGURE 15) | $b^x$ OR c | c OR $d^x$ | a OR $b^x$ OR c | c OR $d^x$ OR e | e | a |
| 16 | 12 | c OR $d^x$ | $b^x$ OR c | c OR $d^x$ OR e | a OR $b^x$ OR c | a | e |

A — A SECTION

FIG.20
F11 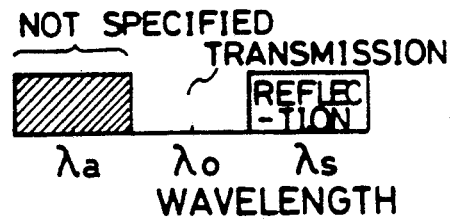
F12 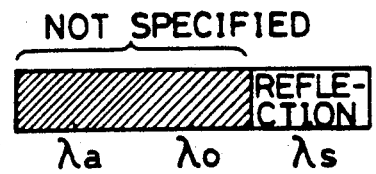
F13 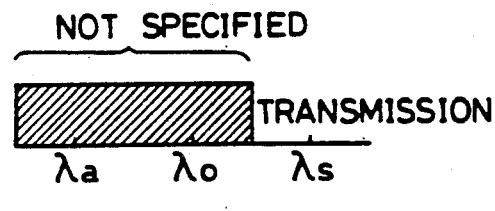
F21 
F22 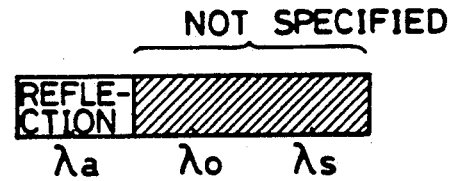
F23 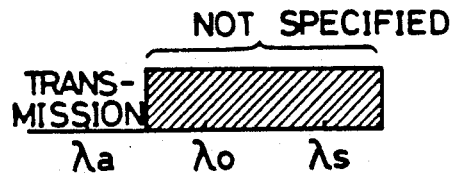

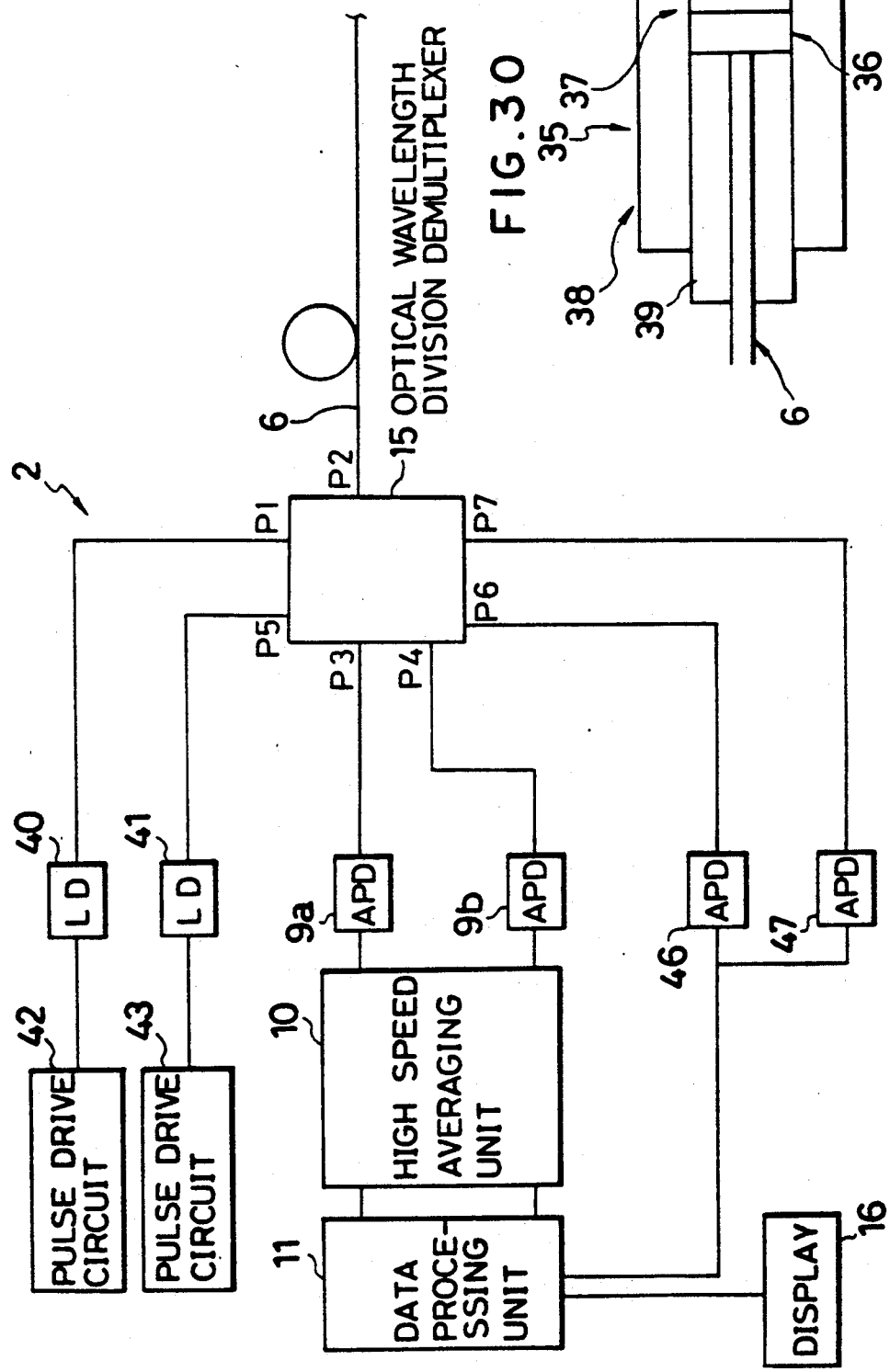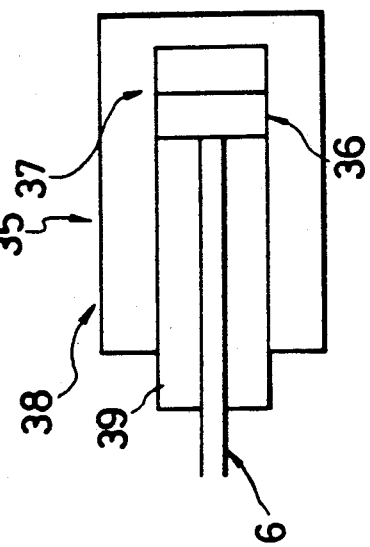

FIG.29(C)
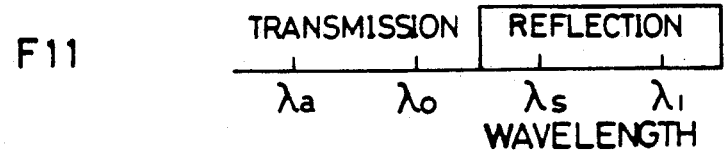
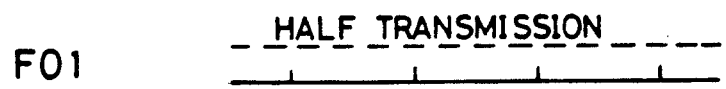
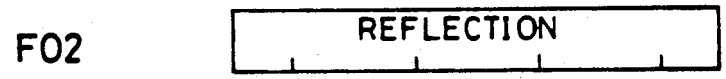
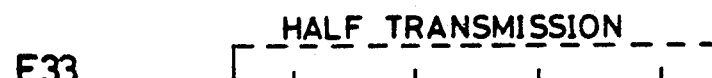
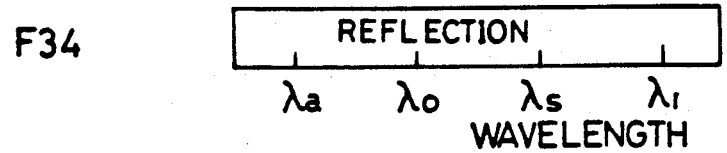

FIBER OPTIC DISTRIBUTED TEMPERATURE SENSOR SYSTEM

BACKGROUND OF THE INVENTION

1. Technical Field

The present invention generally relates to a fiber optic distributed temperature sensor system advantageously employing Raman scattered light.

2. Background Art

A fiber optic distributed temperature sensor arrangement using Raman scattered light measures a temperature distribution along the optical fiber by a following manner: Referring to FIG. 46 of the accompanying drawings, a light beam from one end of the sensor optical fiber, which light beam has a wavelength λo, a pulse width Tw and a pulse period Tp, is an incident light beam. Backward scattered light (reflected light) of two components of Raman scattered light produced in the optical fiber, one is a Stokes light having a wavelength λs and the other is an anti-Stokes light having a wavelength λas, are measured with a sampling time interval Ts, with a pulse light incident time t=0, as shown in FIG. 47. Then, time functions Ia(t) and Is(t) of intensity of the anti-Stokes light and Stokes light are respectively obtained as functions of the sampling time interval Ts. With the fact that the ratio of Ia(t)/Is(t) is purely a function of temperature and the fact that time until the scattered light produced (after the light pulse is input) at a position X in the optical fiber returns to the light pulse incidence end (reflected light measuring part) is 2X/Co. (Co: light velocity in the optical fiber), a temperature distribution measurement is carried out along the optical fiber. Here, the time width Tr (FIG. 47) for the reflected light measurement is 2L/Co (L: length of the optical fiber), and measured data in this time Tr give information of the temperature distribution. The backward scattered light measurements for the stoke light and antistoke light are carried out by a method similar to a method used for an OTDR (Optical Time Domain Reflectometry) device, which device is generally used for detecting breaking or fracture points of an optical fiber.

A temperature distribution measuring system using the optical fiber type temperature distribution sensor arrangement which takes advantage of Raman scattered light is, for example, used as follows: the optical fiber (sensor) is buried along the power cable to detect the temperature distribution along the longitudinal direction of the cable. This detection makes it possible to control an amount of power transmission and to find degradation of the cable by detecting the abnormally high portion in the temperature distribution. Also, it is possible to detect a fire when the sensor is used in a plant, building or tunnel.

FIG. 45 shows a conventional optical fiber type temperature distribution sensor arrangement using Raman scattered light. The sensor includes an optical fiber 6 for the sensor and a temperature distribution measuring system 2.

Pulse light from a pulse light source 4 for the sensor of the temperature distribution measuring system 2 is introduced into an optical fiber 6 (the sensor itself) via an optical fiber 5a and an optical turnout or optical wavelength division demultiplexer 5. A part of backward scattered light (reflected light) generated in the sensor optical fiber 6 is returned to the measuring system 2 and guided into an optical wavelength division demultiplexer 7 via the optical wavelength division demultiplexer 5 and an optical fiber 5b.

Part of the reflected light divided by the optical wavelength division demultiplexer 7 is introduced into the optical fiber 7a and this part enters an anti-Stokes light measuring system 30a such that the time function Ia(t) of the anti-Stokes light intensity is obtained from the light intensity of the above-mentioned part. The anti-Stokes optical measuring system 30a includes an optical filter 8a for the anti-Stokes light having a central wavelength λas, a light receiving device (detector) 9a and an averaging circuit 10a. On the other hand, another part of the reflected light divided by the optical wavelength division demultiplexer 7 is introduced into another optical fiber 7b and enters a Stokes light measuring system 30b such that the time function Is(t) of the Stokes light intensity is obtained from the light intensity of the above-mentioned other part. The stoke optical measuring system 30b includes an optical filter 8b for the Stokes light having a central wavelength λs, a light receiving device (detector) 9b and an averaging circuit 10b. A value of Ia(t)/Is(t) is obtained by a temperature distribution calculation circuit 11 to finally obtain the temperature distribution along the sensor optical fiber. Meanwhile, numeral 16 designates a device for displaying the temperature distribution.

However, according to the conventional optical fiber type temperature distribution sensor arrangement using Raman scattered light, the light emitted from the light source is guided to the sensor optical fiber via the optical wavelength division demultiplexer 5, and the scattered light generated in the sensor optical fiber is guided to the anti-Stokes light or Stokes light measuring system via the optical wavelength division demultiplexers 5 and 7 as well as the optical filter. Therefore, loss of at least 9 dB occurs at the optical wavelength division demultiplexers (3 dB as the light passes through one optical wavelength division demultiplexer), according to theortical calculations. This loss deteriorates the measuring accuracy.

SUMMARY OF THE INVENTION

One object of the present invention is to provide a fiber optic distributed temperature sensor arrangement which is low in attenuation of signal light, thereby improving the measuring accuracy.

According to a first aspect of the present invention, there is provided a fiber optic distributed temperature sensor arrangement which measures the temperature distribution along the longitudinal direction of the optical fiber by measuring the temperature dependency of the intensity of Raman scattered light produced in the optical fiber with use of the OTDR technique, characterized in that the light from the light source is guided into the sensor optical fiber via the optical wavelength division demultiplexer, that light having a wavelength in a particular range among the reflected light of the backward scattered light returning from the sensor optical fiber is reflected by at least one optical filter or is transmitted through the optical filter (the optical wavelength division demultiplexer includes the optical filter) to divide the light and the optical signal is guided into the light receiving device (detector) of the optical measuring system.

The optical wavelength division demultiplexing device includes a first filter allowing the wavelength of the light source to pass therethrough but reflecting Raman scattered light, a second filter receiving the light reflected from the first filter and reflecting Raman scattered light, a third filter receiving the light reflected from the second filter, allowing the wavelength of the anti-Stokes light to pass therethrough but reflecting the wavelength of the Stokes light and a fourth filter receiving the light reflected from the third filter and reflecting the wavelength of the Stokes light. It is preferable that the anti-Stokes light passing through the third filter is guided into the measuring system for the anti-Stokes light and that the Stokes light reflected by the fourth filter is guided into the measuring system for the Stokes light.

A modification of the optical wavelength division demultiplexer may include a first filter allowing the wavelength of the light source but reflecting Raman scattered light and a second filter allowing the light from the light source which has passed through the first filter to pass therethrough but reflecting the anti-Stokes light. In this case, it is possible that the Stokes light reflected by the first filter is introduced into the measuring system for the Stokes light, whereas the anti-Stokes light reflected by the second filter is introduced into another measuring system, which is the measuring system for the anti-Stokes light. Also in this case, it is preferable that at least a third filter allowing the wavelength of the light source to pass therethrough but reflecting the wavelength of the Stokes light is provided in an optical path guiding the Stokes light reflected by the first filter into the Stokes light measuring system or that a fourth filter allowing the wavelength of the light source to pass therethrough but reflecting the wavelength of the anti-Stokes light is provided in an optical path guiding the anti-Stokes light reflected by the second filter into the anti-Stokes light measuring system.

In addition, it is preferable that the wavelength division demultiplexer includes a band-pass filter separating the Stokes light of central wavelength λs from Raman scattered light, the anti-Stokes light of central wavelength λa from Raman scattered light, and that the band-pass filter satisfies following equations (1) to (3):

$$\lambda_{s1} = \lambda_s - k1 \cdot \Delta\lambda_s \quad (1)$$

$$\lambda_{s2} = \lambda_s + k2 \cdot \Delta\lambda_s$$

$$\lambda_{a1} = \lambda_a - k2 \cdot \Delta\lambda_a \quad (2)$$

$$\lambda_{a2} = \lambda_a + k1 \cdot \Delta\lambda_a$$

$$k1 = -0.2 \text{ to } +0.5 \quad (3)$$

$$k2 \geq 0.2$$

where
- $\lambda_{s1}, \lambda_{s2}$: cutoff wavelength of the band-pass filter of the Stokes light;
- $\lambda_{a1}, \lambda_{a2}$: cutoff wavelength of the band-pass filter of the anti-Stokes light;
- $\Delta\lambda_s$: difference between the central wavelength of the input light and the central wavelength of the Stokes light;
- $\Delta\lambda_a$: difference between the central wavelength of the input light and the central wavelength of the anti-Stokes light.

The optical loss of the light source and light signal are reduced, and the measuring accuracy of the temperature distribution sensor arrangement is considerably improved by replacing the optical wavelength division demultiplexers used at a portion guiding the light from the light source into the sensor optical fiber and at a portion guiding the light signal returning from the sensor optical fiber into the optical measuring system by the optical wavelength division demultiplexer which includes the optical filters. When the first filter, allowing the wavelength of the light source to pass therethrough but reflecting Raman scattered light, and the second filter, allowing the light having passed through the first filter to pass therethrough but reflecting the anti-Stokes light, are separately provided, it is possible to equalize the optical path length of the anti-Stokes light with the optical path length of the Stokes light in the optical wavelength division demultiplexer and further to equalize the spatial transmission loss of the Stokes light with that of the anti-Stokes light. The third or fourth filters make it possible to emit the light in the direction the Stokes light measuring system or the anti-Stokes light measuring system are located.

When the band-pass filters satisfying the equations (1), (2) and (3) are employed, the difference between the optical intensity of the anti-Stokes light (or the Stokes light) and the intensity of Rayleigh scattered light becomes large so that Raman scattered light is effectivelly detected.

According to a second aspect of the present invention, there is provided an optical fiber type temperature distribution sensor arrangement including a pair of filters, characterized in that an angular adjustment in coupling two lights is possible by a simultaneous rotation of the two filters which are mounted on a single, mutual adjusting plate and that the two filters are provided on the mutual plate in a manner such that the distance adjustment (the distance between two filters on the mutual plate) is possible, whereby the coupling adjustments between optical fiber connection ports are made easy and the coupling efficiency is improved.

According to a third aspect of the present invention, there is provided a method of detecting a distribution-curve-like information of physical data of, for example, an optical loss along an optical fiber, using an optical fiber type temperature distribution sensor, wherein pulse lights of short time intervals are introduced into the optical fiber, a plurality of backward scattered lights having different wavelengths which are produced in the optical fiber upon the pulse light introduction are received with the same sampling intervals, and a distribution-curve-like information of physical data such as the optical loss along an optical fiber is detected from the relative relationship between the sampled data for the signals of respective wavelengths, characterized in that with respect to distances on the optical fiber calculated from the same sampling numbers and the transmission rates of respective wavelengths, when the distance obtained using the light having a reference wavelength is different from the distance obtained using the light having a different wavelength, the signal generation position of the light having the different wavelength is adjusted or compensated using the distance components, time components and sampling numbers, based on the respective transmission rates for the respective wavelengths, in a manner such that it becomes approximately the same distance as the signal-generation position of the reference wavelength.

When the signal waves of the plural backward scattered light having different wavelengths are sampled at the same sampling timing, a difference appears between the light having the reference wavelength (wave a) and the other light having a different wavelength (wave b), with respect to the calculated distances on the optical fiber, since the transmission rate depends on the wavelength. This difference is accumulated as the sampling number increases. In the present invention, in order to eliminate this error, the information on the distance on the optical fiber is calculated in consideration of the transmission rate difference between the waves a and b and the information is converted in a plurality of information at approximately the same positions to obtain necessary physical information at the compensated positions. Specifically, the distance components, time components and/or sampling numbers are compensated, based on the transmission rates of the waves a and b, in a manner such that the signal generation position of the wave b becomes equal to the signal generation position of the wave a (the wave a is the reference wave). Therefore, this method is advantageous in a case where the transmission rates of the waves a and b are known and constant.

A modification of this method is as follows: instead of using the transmission rates for respective known wavelengths, a relative velocity of respective wavelengths obtained from ratios of sampling numbers is used or time spent until the scattered light or the reflected light returns from a known position on the optical fiber detecting the information is used.

According to this modification, the transmission rates are replaced by the relative rate of respective wavelengths which is obtained from a ratio of times spent until the scattered light or the reflected light returns from a position on the optical fiber which is already a known position such as the far end (free end) of the optical fiber or a ratio of sampling numbers. Therefore, this approach is advantageous when the transmission rates of the waves a and b are unknown or when they change.

According to the method of the third aspect of the present invention, including the above modification, from the relative relationship between the value of the signal at a first sampling timing for the light having the reference wavelength and the value at a sampling time corresponding to the first sampling timing, which is obtained from interpolation of two values of lights having different wavelenghts at sampling timings before and after the first sampling timing, information at the position obtained from the first sampling timing for the light having the reference wavelength is obtained, whereby the information distribution along the optical fiber is obtained.

Also, the information at the position of the light having the reference wavelength is obtained from the relative relationship of the value of the signal of the light having the reference wavelength at a certain sampling timing or a certain sampling position and the value at a time or a position corresponding to the just-mentioned certain time or position, which is obtained from an interpolation of two values of light having different wavelengths at times or positions before and after the above-mentioned certain sampling time or position.

Another modification is as follows: with respect to the distance on the optical fiber which is calculated from the same sampling numbers and the transmission rates of respective wavelengths, where the distance obtained from the light having the reference wavelength is different from the distance obtained from another light having another wavelength, and this distance difference exceeds a predetermined distance which is within a distance calculated from the sampling interval and the transmission rate (or the relative rate) of the light having the reference wavelength, the sampling numbers are shifted by one, and this sampling number sifting is repeated as the predetermined distance is exceeded. An information distribution is obtained from the relative relationship between signal values of the light having the wavelength obtained in this manner and signal values of the light having the reference wavelength.

According to this modification, every time when the distance difference reaches a predetermined distance interval such as half of a distance La calculated from the sampling interval and the transmission rate of the light having the reference wavelength or the relative rate, the sampling numbers are shifted by one thereafter and the shifting is repeated. In this case also, like the case described before this modification, the signal generation positions of the waves a and b are adjusted to match to each other. A phrase "to reach a predetermined distance interval" may mean "to reach a time corresponding to the predetermined distance" and/or "to reach a sampling number corresponding to the predetermined distance".

According to a fourth aspect of the present invention, there is provided a fiber optic distributed temperature sensor arrangement which can detect a temperature distribution near the free end of the optical fiber. To this end, a nonreflective treatment is applied to the free end portion of the optical fiber to considerably lower the reflected light at the free end portion. This eliminates the influence of the reflected light at the free end portion, on the scattered light and makes it possible to measure the temperature distribution all along the optical fiber.

The nonreflective treatment may be replaced by other measures. For example, a GaAs sensor including GaAs and a reflective film may be provided at the free end of the optical fiber. The light transmitted through the optical fiber is reflected by the GaAs sensor at the free end of the optical fiber and transmitted through the optical fiber again. At this situation, the light of a first laser beam source, i.e., the light having a short wavelength which is easily absorbed by GaAs, is absorbed by GaAs so that the reflected light is reduced. On the other hand, since the light of a second laser beam source, i.e., the light having a long wavelength which serves as a reference light, is not absorbed by GaAs, the reflected light is constant. The light having the wavelength near the end wavelength of the absorbing area of the GaAs sensor, i.e., Rayleigh scattered light, is detected by a first light receiving device (a first detector) whereas the reference light of the GaAs sensor is detected by a second light receiving device (a second detector), and then a strength ratio of two lights are calculated to obtain a temperature at the free end of the optical fiber.

As a modification of the foregoing, an optical wavelength division demultiplexer may be provided at one or more portions of the sensor optical fiber and the GaAs sensors including the GaAs and the reflective film are attached to the free ends of the branched optical fibers.

According to a fifth aspect of the present invention, there is provided a method of measuring a temperature distribution using a control signal measuring system and an APD (avalanche photodiode) characterized in that an averaging-processed value (measuring results) of the intensities of the anti-Stokes light and the Stokes light of the control signal measuring system used for controlling a detection sensitivity of the APD is not directly used. Instead, a temperature of the control signal measuring system is processed and also used as information for the APD detection sensitivity control.

According to a sixth aspect of the present invention, there is provided a temperature distribution measuring sensor arrangement characterized in that there is provided a computing device for obtaining the transmission loss difference of two components (the anti-Stokes light and the Stokes light) of Raman scattered light necessary for calculation of the temperature distribution, using the measured Raman scattered light intensity, whereby the temperature distribution measurement of an arbitrary optical fiber is realized with a high accuracy, even if the transmission loss changes with time. With this sensor arrangement, a relation between the optical fiber transmission loss and the measured values of two components of Raman scattered light is drawn, the influence of the optical fiber transmission loss to the temperature measuring is eliminated, and the transmission loss on two components of Raman scattered light is obtained from the above-mentioned relation.

According to a seventh aspect of the present invention, there is provided a temperature distribution measuring sensor arrangement characterized in that a reflection plate is provided at a free end of the sensor optical fiber in a manner such that the light input from a measuring system is entirely reflected by the reflection plate and that the measuring system includes an optical measuring unit for measuring one (for example, the anti-Stokes light) of two components of the back scattered light of the sensor optical fiber and a temperature distribution computing circuit for obtaining the temperature distribution along the sensor optical fiber by processing a scattered light intensity a' of a light reflected by the reflection plate and a scattered light intensity a of a transmitted light of an optical pulse output from a light source, the light being emitted from a light source and measured by the optical measuring unit.

Since it is possible to obtain the temperature information using only one component of Raman scattered light and the influence of the optical loss is eliminated by processing a sum of the scattered light intensities a and a', the measuring accuracy is improved remarkably. Also, the arrangement is simple and inexpensive.

According to an eighth aspect of the present invention, there is provided a temperature distribution measuring sensor arrangement characterized in that in order to detect a temperature of an object smaller than the minimum detectable distance of the system, the optical fiber is drawn out by a length more than twice the minimum detectable distance and that this drawn out portion is wound like an "8" and placed in an oval casing to form an optical fiber type spot sensor without cutting and diffusion coupling the sensor optical fiber which is already installed.

The reason why the 8-shaped optical fiber portion is made is as follows. When the optical fiber is cut and coiled, it is possible not to twist the optical fiber during coiling. However, without cutting, as the optical fiber is coiled, the optical fiber is twisted by one rotation (360°) for one-turn-coiling so that the number of twists increases proportionally to the number of turns. On the other hand, if the optical fiber is wound like an 8, the optical fiber is twisted by 180° as it is turned half round in one direction but twisted by 180° as it is turned another half in the opposite direction, whereby the twist is counterbalanced and the number of twists does not increase.

BRIEF DESCRIPTION OF THE DRAWINGS

FIG. 11 illustrates combinations of the optical filters used in the fifth to eighth embodiments of the present invention;

FIG. 17 illustrates combinations of the optical filters used in the thirteenth to sixteenth embodiments of the present invention;

FIG. 20 is a set of views showing characteristics of optical filters employed for the wave divider of FIG. 18;

FIG. 29 (B) is a construction diagram of the optical wavelength division demultiplexer;

FIG. 29 (C) illustrates the characteristics of the optical filters used in the optical wavelength division demultiplexer;

FIG. 30 illustrates a free end of the optical fiber according to the present invention;

DESCRIPTION OF THE PREFERRED EMBODIMENTS

The present invention will now be explained in accordance with embodiments shown in the accompanying drawings.

WAVELENGTH DIVISION DEMULTIPLEXER

Embodiment 1

Figure 1:
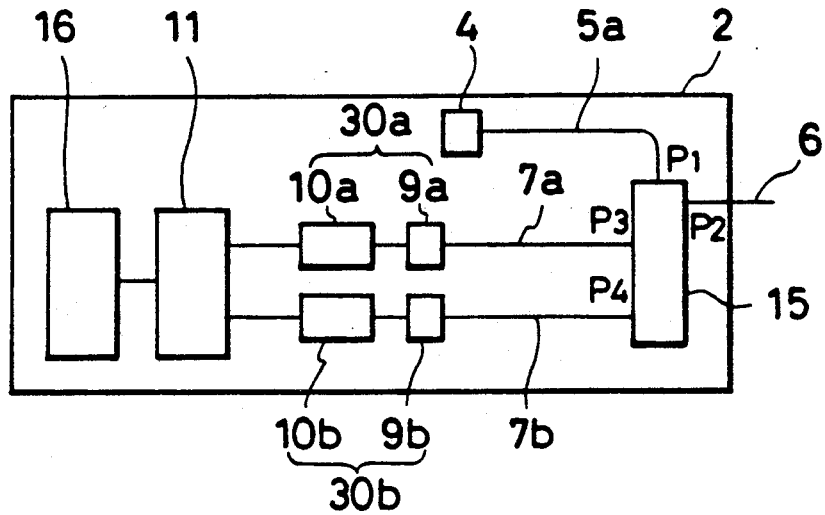
FIG. 1 is a view showing an embodiment of a fiber-optic temperature distribution sensor according to the present invention.
Figure 45:
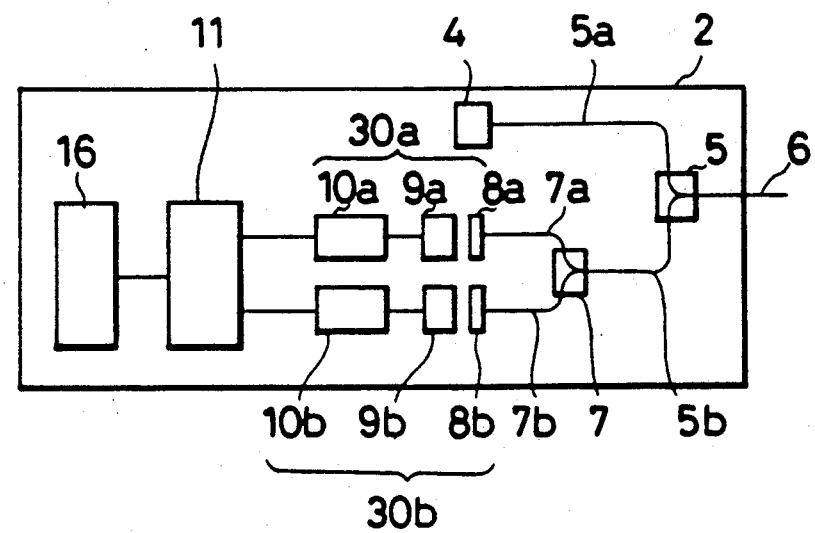
FIG. 45 shows a conventional optical fiber type temperature distribution sensor arrangement.
Figure 46:
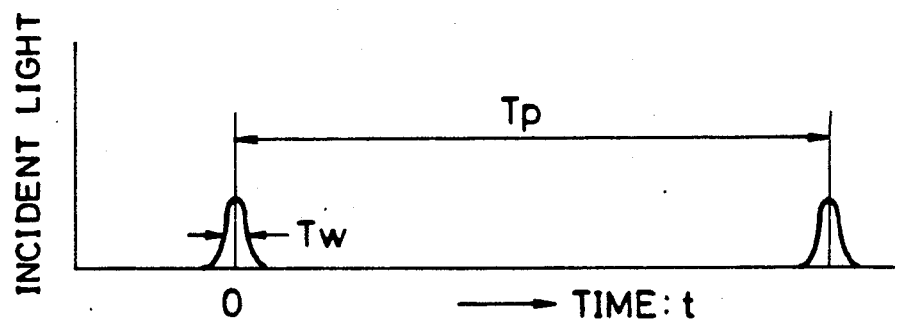
FIG. 46 is a graph of pulses of an incident light beam carried along an optical fiber.

The construction of a distribution temperature sensor of the optical fiber type shown in FIG. 1 is similar to the conventional sensor depicted in FIG. 45. However, an optical wavelength division demultiplexer 15 is used between a pulsating light source 4, an optical fiber 6 for the sensor and light-receiving devices (detectors) 30a, 30b.

Figure 2:
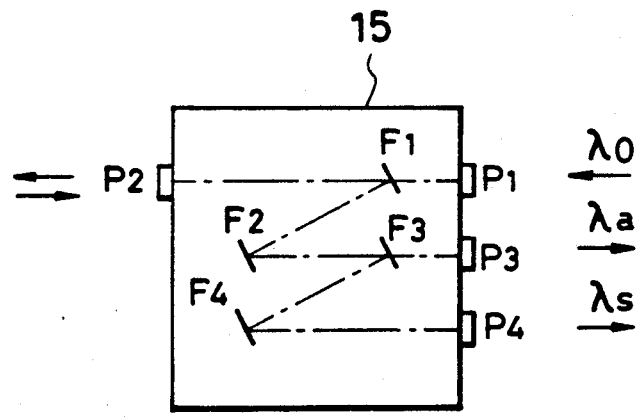
FIG. 2 is a view illustrating an optical wavelength division demultiplexer used for the sensor of FIG. 1.

As shown in FIG. 2, the optical wavelength division demultiplexer 15 is constructed of connecting ports P1, P2, P3 and P4, and optical filters F1, F2, F3 and F4. The optical filters have the characteristics depicted in FIG. 3, respectively.

Figure 3:
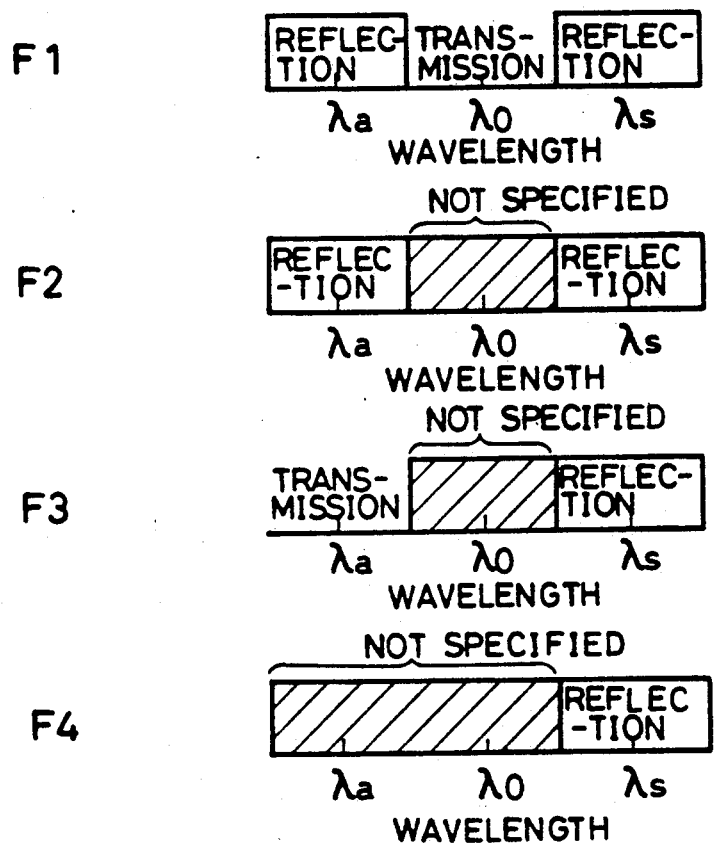
FIG. 3 is a set of characteristic diagrams of an optical filter used for the optical wavelength division demultiplex of FIG. 2.

Referring to FIG. 3, there is shown a center wavelength $\lambda o$ of light emitted from the light source, a wavelength $\lambda a$ of anti-Stokes light, a wavelength $\lambda s$ of a Stokes light and a segment indicated by the oblique line, which is representative of a region to which no designation or provision is made as to whether light is transmitted or reflected. A first filter F1 of these optical filters has the characteristic for causing light with the wavelength $\lambda o$ to be transmitted therethrough and light with the wavelengths $\lambda a$, $\lambda s$ to be reflected therefrom. A second filter F2 has the characteristic for receiving the reflected light from the first filter and causing the wavelengths $\lambda a$, $\lambda s$ to be reflected therefrom. However, the filter F2 has a region to which no designation or provision is made as to whether the light with the wavelength $\lambda o$ is transmitted or reflected, because there is no need to do so. A third filter F3 has the characteristic for receiving the reflected light from the second filter F2 and causing the light with the wavelength $\lambda a$ to be transmitted thereto, thereby to be transmitted, and for causing the light with the wavelength $\lambda s$ to be reflected therefrom, with no provision of the wavelength $\lambda o$ made therein. A fourth filter F4 has the characteristic for causing light with the wavelength $\lambda s$ to be reflected therefrom, with no provision of the wavelengths $\lambda a$, $\lambda o$ made therein.

In the optical wavelength division demultiplexer 15, the light source 4 is coupled to the connecting port P1, the optical fiber 6 is coupled to the connecting port P2, a measuring system 30a for an anti-Stokes light is connected to the connecting port P3, and a measuring system 30b for a Stokes light is coupled to the connecting port P4. As a consequence, light having the wavelength $\lambda o$ applied from the light source to the connecting port P1 is introduced through the first filter F1 to the optical fiber 6 of the connecting port 2. Light having the wavelength λa out of back scattered light returned from the optical fiber 6 is reflected by the first and second filters F1, F2 and reaches the third filter F3, followed by passage through the third filter F3, and then introduced into the measuring system 30a for the anti-Stokes light. In addition, light having the wavelength λs is reflected by the filters F1, F2, F3 and F4 and then introduced through the connecting port P4 into the measuring system 30b for the Stokes light.

Where the optical wavelength division demultiplexer 15 having the above-described construction is employed, the light loss caused between the light source 4, the optical fiber 6 and light receivers 9a or 9b is determined as follows, assuming that the light loss produced when light is transmitted in the form of parallel beams between the two connecting ports is 2 dB, the light loss produced when light passes through the optical filters is 0.5 dB/one filter (one sheet), and the light loss produced when light is reflected by the optical filters is 0.25 dB/sheet. In other words, the light loss produced between the light source 4 and the optical fiber 6 becomes 2.5 dB (=2+0.5), the light loss produced between the optical fiber 6 and the light receiver 9a for the antistoke light becomes 3 dB (=2+0.5+0.25×2), and the light loss developed between the optical fiber 6 and the light receiver 9b for the Stokes light becomes 3.5 dB (=2+0.5+0.25×4). Thus, the light loss in total between the light source 4, the optical fiber 6 and the receivers 9a or 9b is 5.5 dB with respect to the anti-Stokes light (λa) and is 6.0 dB with respect to the Stokes light (λs).

On the other hand, assuming that the light loss produced by conventional optical wavelength division demultiplexer 5, 7 is 4 dB (branch loss 3 dB+excess loss 1 dB) and the space transmission loss produced at the optical filter is 1 dB, in a method in which the optical wavelength division demultiplexers 5, 7 and optical filters 8a, 8b are employed, the total light loss becomes 13.5 dB (=4×3+1+0.5).

Accordingly, the light loss can be reduced by 8 dB (=13.5−5.5) or 7.5 dB where the present invention is adapted. Where one-way transmission loss of the optical fiber is assumed to be 3 dB/km, the effect in reducing the light loss by 8 dB can produce an outcome corresponding to 1.3 km in terms of a round way. As a consequence, a distance to be measured can extend up to 1.3 km without changing the measuring accuracy where the present invention is adapted, thereby leading to a further improvement in distance.

A description has principally been made on the construction and features in the above-described embodiment. However, an embodiment in which Raman scattered light is detected efficiently will hereinafter be described in detail.

Figure 4A:
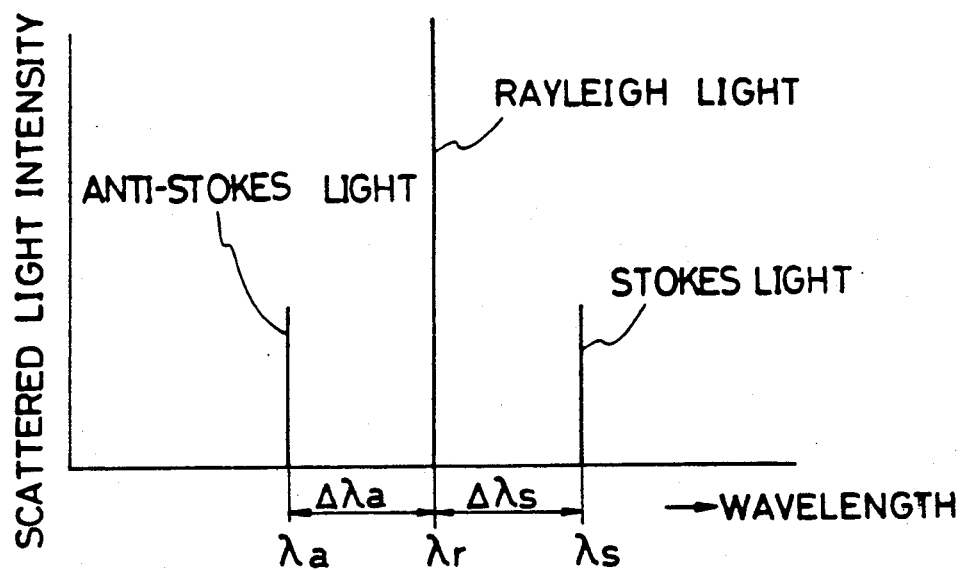
FIGS. 4a and 4b are a set of spectrum diagrams of Raman scattered light.
Figure 4B:
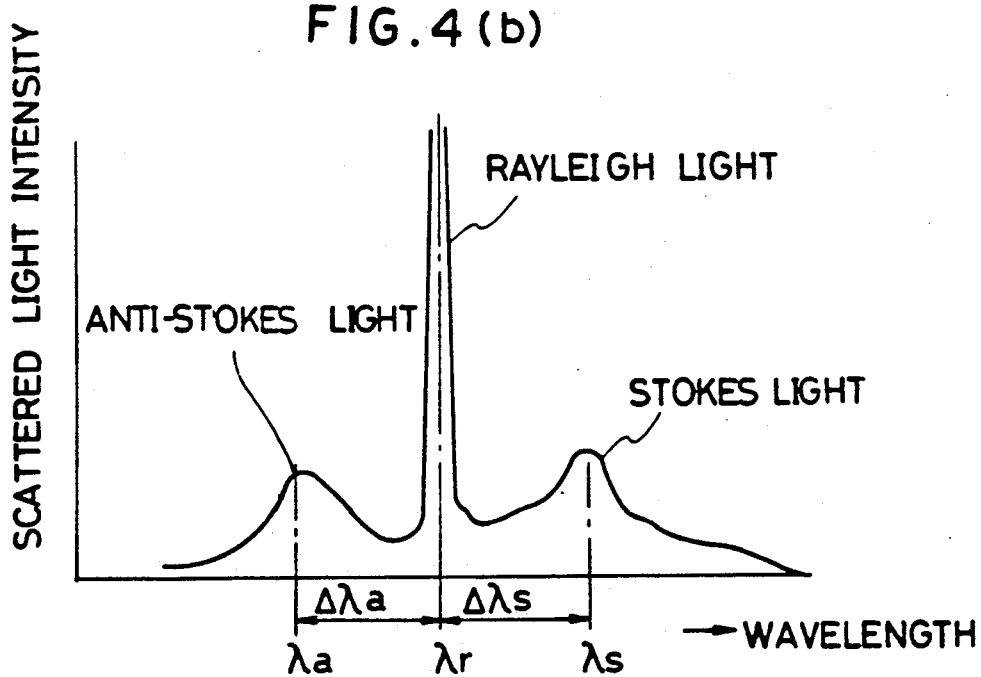

FIG. 4 is a graphic representation for describing the spectrum of the Raman scattered light, in which FIG. 4(a) is a graph showing the concept of the light and FIG. 4(b) is a graph showing the spectrum actually measured through the optical fiber.

The wavelength (λr) of the Rayleigh scattered light is the same as the wavelength (λo). However, the wavelength (λs) of the Stokes light and the wavelength (λa) of the anti-Stokes light, which form the Raman scattered light, is produced with +Δλs and −Δλa only deviated from the wavelength of the incident light, respectively. The Raman scattered light is weak scattered light reduced by about a number of 2-3 figures as compared with the Rayleigh scattered light, and the deviations (Δλs and Δλa and Δλa) of the wavelenghts are short (about 30 nm). Therefore, the following means or device become necessary in order to detect the Raman scattered light separately form the Rayleigh scattered light.

Figure 5:
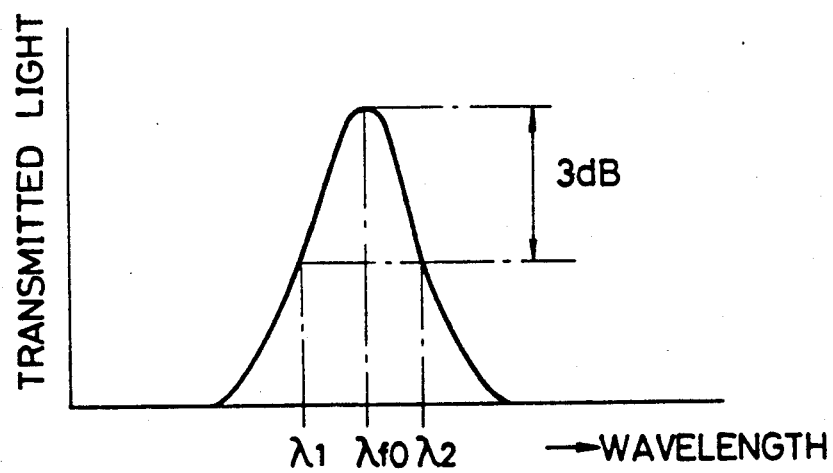
FIG. 5 is a concept view of a band of a band-pass filter.

First of all, FIG. 5 shows the concept of a band of a bandpass filter. Wavelengths of $\lambda_1 - \lambda_2$ at its band shows those at a point where a transmitted light is reduced by 3 dB from a center wavelength λfo.

The intensity Is of the Stokes light has been investigated using such a bandpass filter.

Embodiment 1 for actually measuring its intensity Is will be shown in FIG. 6.

Figure 6A:
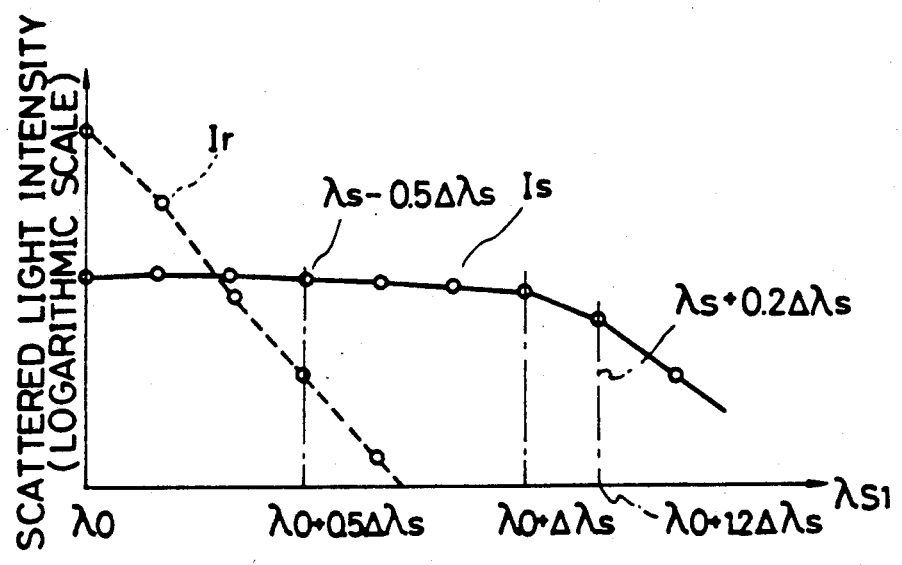
FIGS. 6a and 6b are a set of views useful to explain characteristics of the optical filter and optical intensity of the scattered light, which is one of major parts of the present invention.

FIG. 6(a) shows the relationship between the intensity Is of the stoke light and the intensity Ir of the Rayleigh scattered light obtained depending on changes in the wavelength $\lambda_{s1}$ on the side of shortwaves, assuming that the wavelength $\lambda_{s2}$ on the side of long waves, out of the wavelengths $\lambda_{s1} - \lambda_{s2}$ at the bandpass of the Stokes light, is constant ($\lambda_{s2} = \lambda s + \Delta \lambda s$). Thus, the following is understood from the same drawing.

(1) The Rayleigh scattered light Ir is at its intensity reduced in the form of an exponential function as the wavelength $\lambda_{s1}$ on the side of shortwaves as the bandpass of the Stokes light increases.

(2) The intensity Is of the Stokes light is also reduced as the wavelength $\lambda_{s1}$ on the side of the shortwaves at its bandpass increases. However, the degree of its reduction is slight.

(3) The region of the wavelenth $\lambda_{s1}$ at a point where the intensity Is of the Stokes light is sufficiently larger than that of the Rayleigh scattered light is determined as follows:

$$\lambda_{s1} \geq \lambda_0 + 0.5\Delta\lambda_s = \lambda_s - 0.5\Delta\lambda_s.$$

(4) When $\lambda_{s1} \geq \lambda_0 + 1.2\Delta\lambda s = \lambda s + 0.2\Delta\lambda s$, the intensity Is of the Stokes light is reduced.

Figure 6B:
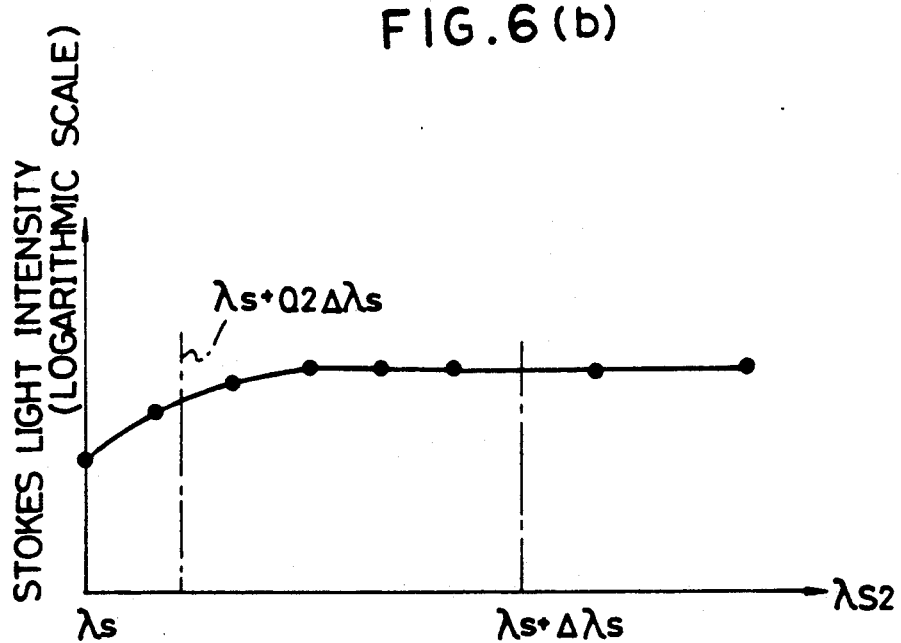

FIG. 6(b) shows the intensity Is of the Stokes light obtained depending on changes in the wavelenth $\lambda_{s2}$ on the side of long waves, assuming that the wavelength $\lambda_{s1}$ on the side of the shortwaves, out of the wavelengths $\lambda_{s1} - \lambda_{s2}$ at the bandpass of the stoke light, is constant ($\lambda_{s1} = \lambda s - 0.5\Delta\lambda s$).

The intensity Is of the stoke light becomes larger as the wavelenth $\lambda_{s2}$ increases. However, its reduction effect appears positively when the following expression is established:

$$\lambda_{s2} \geq \lambda_s + 0.2\lambda_s$$

Afterwards, the intensity Is of the Stokes light is gradually raised.

Incidentally, although the intensity of the Rayleigh scattered light is not shown in the present drawing, its intensity becomes negligibly small at this region.

Accordingly, the pass band ($\lambda_{s1}$, $\lambda_{s2}$: these are designated by the wavelength at a point reduced by 3 dB from the center wavelength λs, i.e., a transmission value) of the bandpass filter, which is suitable for the separation of the Stokes light, is expressed by the characteristics shown in FIG. 6 as follows:

$$\lambda_{s1} = \lambda_s - k1 \cdot \Delta\lambda_s$$

$$\lambda_{s2} = \lambda_s + k2 \cdot \Delta\lambda_s$$

$$k1 = -0.2 \sim +0.5,$$

$$k2 \geq 0.2$$

A description has been made on the Stokes light in the above Embodiment 1. Similarly, it has been found from the similar experiment as described above that the pass band ($\lambda_{a1}$, $\lambda_{a2}$) of the bandpass filter, represented by the following expressions, is suitable as a means for effective separation of the anti-Stokes light.

$$\lambda_{a1} = \lambda_a - k2 \cdot \Delta\lambda_a$$

$$\lambda_{a2} = \lambda_a + k1 \cdot \Delta\lambda_a$$

$$k1 = -0.2 \sim +0.5$$

$$k2 \geq 0.2$$

A description will now be made on other Embodiments 2 through 8 of the present invention.

EMBODIMENT 2

Figure 7:
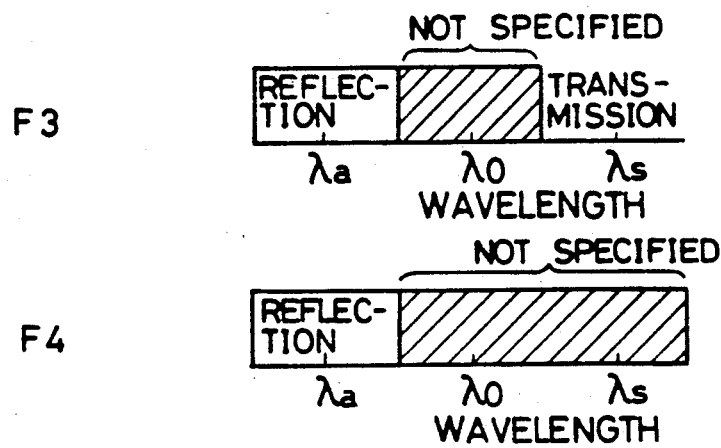
FIG. 7 shows characteristics of an optical filter used in a second embodiment of the present invention.

In the above-described embodiment, the connecting port P3 is connected to the anti-Stokes light measuring system whereas the connecting port P4 is coupled to the Stokes light measuring system. However, even when the connecting port P4 is used as an alternative to the connecting port P3 connected to the measuring system for the anti-Stokes light and vice versa, the characteristics of the optical filters to be used remain unchanged with respect to the first and second filters F1, F2, and the characteristics of the third and fourth filters F3, F4 are changed to those shown in FIG. 7, and the same desired effects as those obtained in the previous embodiment can be anticipated.

EMBODIMENT 3

Figure 8:
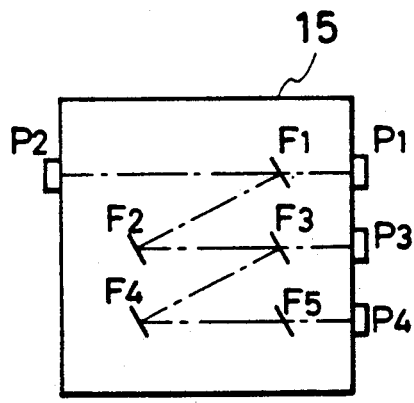
FIG. 8 illustrates an optical wavelength division demultiplexer used in third and fourth embodiments of the present invention.
Figure 9:
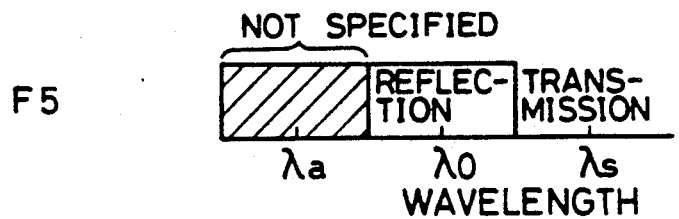
FIG. 9 illustrates characteristics of an optical filter used in the third embodiment.
Figure 10A:
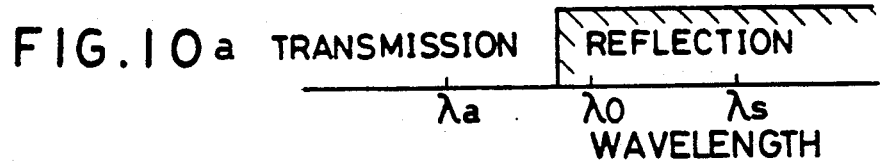
FIGS. 10a, 10b, 10c, 10d, and 10e are a set of characteristics diagrams of optical filters used in the fifth to eighth embodiments of the present invention.
Figure 10B:
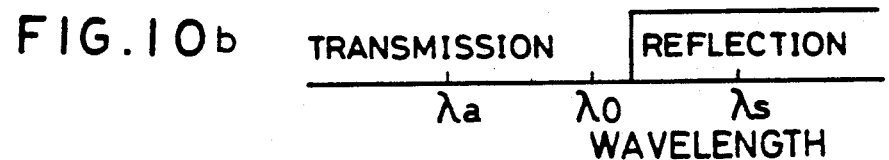
Figure 10C:
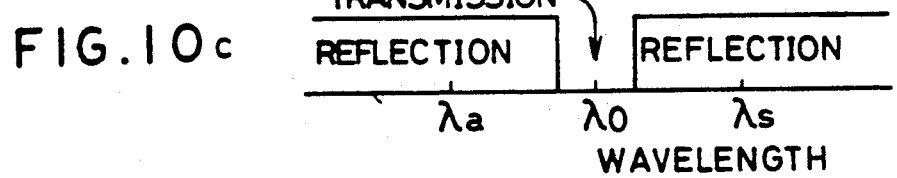
Figure 10D:
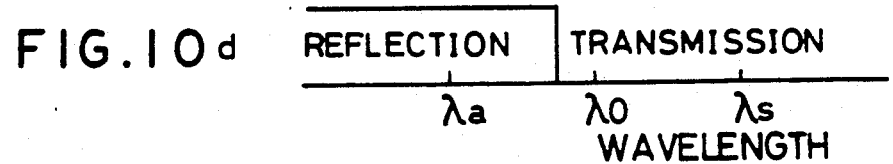
Figure 10E:
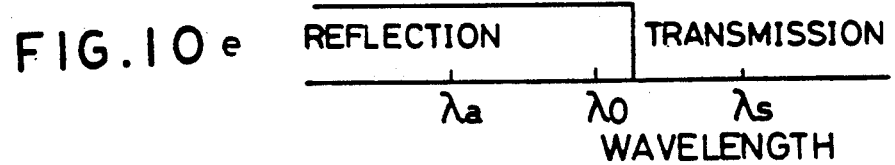

As shown in FIG. 8, when a fifth filter F5 having the characteristic shown in FIG. 9 is additionally provided between the fourth filter F4 and the connecting port P4, in the structure of FIG. 1 as the first embodiment, the degree of eliminating the capacity of light having the given wavelength, which is emitted from the light source and enters the Stokes light measuring system 30s connected to the connecting port P4, is raised, thereby making it possible to obtain a superb characteristic of the distribution temperature sensor of the optical fiber type.

EMBODIMENT 4

Similarly, in the above-described second embodiment, when an optical filter having the same function as that employed in Embodiment 3 is additionally provided at the same position as the fifth filter F5 of FIG. 8, the degree of eliminating the capacity of light having the given wavelength, which is emitted from the light source and enters the anti-Stokes light measuring system 30a coupled to the connecting port P4, can be increased.

EMBODIMENTS 5-8

In the illustrated Embodiments 1 through 4, the characteristics of the optical filters employed in a single optical wavelength division demultiplexer are all different from one another. However, when optical filters having the characteristics of a to e types are used in combination as shown in FIG. 11, the optical filters having the same characteristics can be used at two or more positions, thereby making it possible to reduce their manufacturing costs. Two or three kinds of filter characteristics can be selected out of filter characteristics shown in FIG. 11. It is however desirable to use the optical filters marked with asterisks (*) in a table in order to reduce, to the utmost, the degree of entry of light having the given wavelentgh, which is emitted from the light source into the light measuring system and the degree of input of light having the given wavelength other than that having a certain wavelength to be measured into the light measuring system.

As described above, when the optical wavelength division demultiplexers 5, 7 (FIG. 45), employed in a portion for introducing light emitted from the light source into the optical fiber for the sensor and in a portion for introducing light as a signal returned from the optical fiber into an optical measuring system, are replaced with the optical wavelength division demultiplexer 15 (FIG. 2) made of the optical filters, the loss of both the light as the signal and light emitted from the light source becomes small, so that the measuring accuracy of the distribution temperature sensor of the optical fiber type is greatly improved.

The optical wavelength division demultiplexer shown in FIG. 2 is however accompanied by the drawback that the optical path length of the stoke light, which is transmitted to the connecting port P4 of the optical wavelength division demultiplexer 15, is longer than that of the anti-Stokes light transmitted to the connecting port P3, so that the space transmission loss between the connecting ports P2 and P4 is greater than that between the connecting ports P2 and P3. More specifically, the space transmission loss between the connecting ports P2 and P3 can be set to be 2 dB, whereas the space transmission loss between the connecting ports P2 and P4 is 4 dB, thereby causing excess loss by 2 dB as compared with the space transmission loss between the connecting ports P2 and P3.

EMBODIMENT 9

Figure 12:
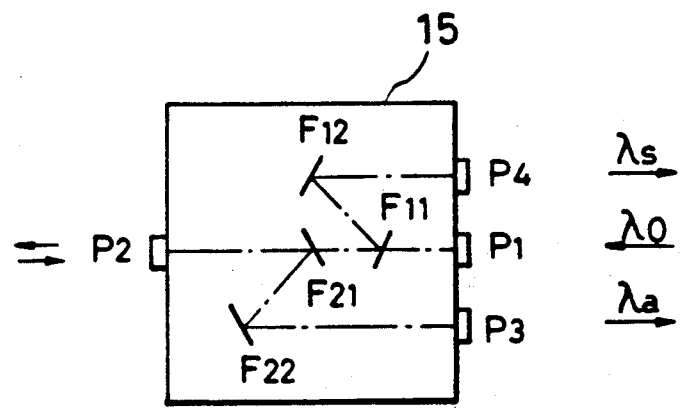
FIG. 12 shows one example of the optical wavelength division demultiplexer used in a ninth embodiment of the present invention.

Embodiment 9 shown in FIG. 12 is constructed such that the space transmission loss of both of the anti-Stokes light and the Stokes light as two components of the Raman scattered light whose loss being produced within the optical wavelength division demultiplexer is reduced so that the distributed temperature can finally be measured with high accuracy.

Referring now to FIG. 12, an optical wavelength division demultiplexer 15 is constructed of connecting ports P1 to P4 and four optical filters F11, F12, F21 and F22 in the same manner as those shown in FIG. 2. However, this optical wavelength division demultiplexer 15 is different from that shown in FIG. 2 in that the optical filters are divided into two groups, i.e., one optical wavelength division demultiplexer (F11, F12) used for the Stokes light, and another branching system (F21, F22) used for the anti-Stokes light, and optical filters having the characteristics shown in FIG. 13 are used for these respective optical filters.

Figure 13:
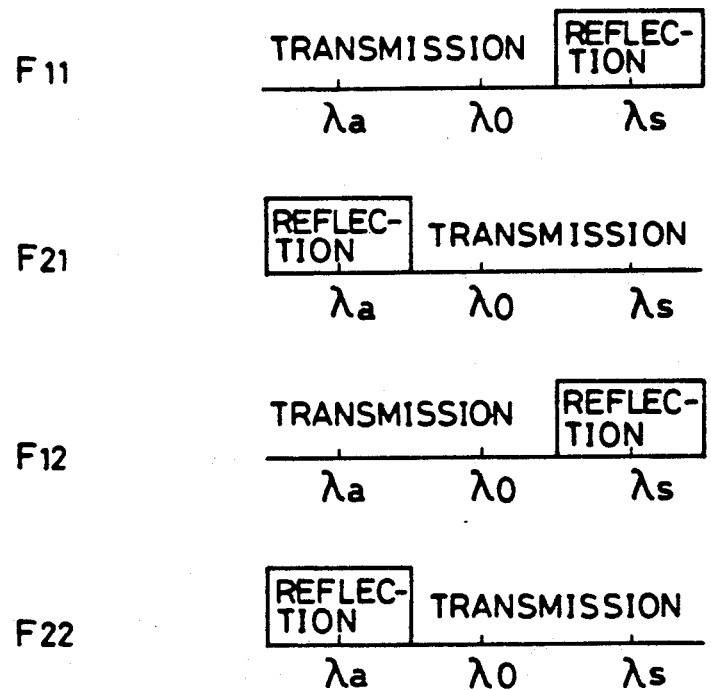
FIG. 13 is a set of views showing a characteristic diagram of an optical filter used for the optical wavelength division demultiplexer of FIG. 12.

In FIG. 13, there are shown a center wavelength $\lambda o$ of light emitted from the light source, a wavelength $\lambda a$ of the anti-Stokes light, and a wavelength $\lambda s$ of the Stokes light. A first filter F11 of the wavelength division demultiplexer system for the Stokes light, out of these optical filters, has the characteristics for causing light with the wavelength $\lambda o$ to be transmitted therethrough and light with the wavelength $\lambda s$ to be reflected therefrom. A second filter F21 of the branching system for the anti-Stokes light has the characteristics for causing light with the wavelength λo which has passed through the first filter F11 to be transmitted and for causing light with the wavelength λa to be reflected therefrom. A third filter F12 of the branching system for the Stokes light has the characteristics for receiving the reflected light from the first filter F11 and for causing the light with the wavelength λa to be transmitted so as to be atteunated, and also for causing the light with the wavelength λo to be transmitted so as to be attenuated. A fourth filter F22 of the branching system for the anti-Stokes light has the characteristics for receiving the reflected light from the second filter F21 and causing the light with the wavelength λa to be reflected therefrom, and for causing the light with the wavelength λo to be transmitted so as to be attenuated.

In the above optical wavelength division demultiplexer 15, the light source 4 is connected to the connecting port P1, the optical fiber 6 for the sensor is coupled to the connecting port P2, the measuring system 30b for the stoke light is coupled to the connecting port P4, and the measuring system 30a for the anti-Stokes light is coupled to the connecting port P3. As a consequence, the light with the wavelength λo, which is emitted from the light source through the connecting port, is introduced into the optical fiber 6 of the connecting port P2 through the first and second filters F11 and F21. One with the wavelength λa, out of back scattered light returned from the optical fiber 6, is reflected by the second filter F21 into the fourth filter F22, followed by subjection of the same to further reflection by the fourth filter F22 and introduced into the measuring system 30a for the anti-Stokes light through the connecting port P3. One with the wavelength λs out of them passes through the optical filter F21 and is thereafter reflected by the first filter F11, followed by subjection of the same to further reflection by the third filter F12 and then introduced into the measuring system 30b for the Stokes light through the connecting port P4.

Where the optical wavelength division demultiplexer 15 having the construction shown in FIG. 12 is employed, the light loss produced between the pulsating light source 4, the optical fiber 6 and the light receiver 9a or 9b is determined as follows assuming that the light loss produced when light is transmitted in the form of parallel beams between the two connecting ports is 2 dB, the light loss produced when light passes through the optical filters is 0.5 dB/sheet, and the light loss produced when light is reflected by the optical filters is 0.25 dB/sheet. In other words, the light loss produced between the light source 4 and the optical fiber 6 becomes 3.0 dB $(=2+0.5\times2)$, the light loss produced between the optical fiber 6 and the light receiver 9a for the anti-Stokes light becomes 2.5 dB $(=2+0.25\times2)$, and the light loss developed between the optical fiber 6 and the light receiver 9b for the Stokes light becomes 3.0 dB $(=2+0.5+0.25\times2)$. Thus, the light loss in total between the light source 4, the optical fiber 6 and the receiver 9a or 9b is 5.5 dB with respect to the antistoke light (λa), whereas it is 6.0 dB with respect to the stoke light (λs).

On the other hand, where the optical wavelength division multi shown in FIG. 2 is employed in the same manner as described above, the light loss calculated based on such a method as referred to above is as follows. In other words, the light loss between the light source 4 and the optical fiber 6 is 2.5 dB $(=2+0.5)$, and the light loss between the optical fiber 6 and the receiver 9a for the anti-Stokes light is 3.0 dB $(=2+0.5+0.25\times2)$. Thus, the total light loss between the light source, the optical fiber and the receiver is 5.5 dB with respect to the anti-Stokes light (λa) whereas it is 6.0 dB with respect to the Stokes light (λs). At this point, the total light loss is the same as that in FIG. 12.

As has already been pointed out, the result obtained by actually measuring the light loss with the optical wavelength division demultiplexer of FIG. 2 is such that the total light loss with respect to the Stokes light (λs) is greater by 2 dB as compared with the calculated value, and hence the optical wavelength division demultiplexer of FIG. 12 is superior to that of FIG. 2 by such a degree, i.e., 2 dB. As a result of actual measurement of the total light loss under the construction of FIG. 12, the light loss is 5.6 dB in total with respect to the anti-Stokes light (λa), while it is 6.1 dB in total with respect to the Stokes light (λs). Thus, their values are as calculated. It has therefore been confirmed that the construction of FIG. 12 is superior to that of FIG. 2.

In the above-described manner, the light loss can considerably be reduced by providing the optical filters as optical couplers for the distribution temperature sensor of the optical fiber type, of a type wherein light with the wavelength λo, which is emitted from the light source, is only transmitted between the pulsating light source 4 and the optical fiber 6, the connecting port (P4), i.e., the light-receiving port for the Stokes light and the connecting port (P3), i.e., light-receiving port for the anti-Stokes light, light of their respective wavelength bands is only transmitted, and by using the optical wavelength division demultiplexer having the construction in which the light loss of the Stokes light is substantially similar to that of the anti-Stokes light.

Similarly, in the above-described Embodiment 9, the pass band ($\lambda_{s1}$, $\lambda_{s2}$: these are designated by the wavelength at a point reduced by 3 dB from the center wavelength $\lambda_s$, i.e., a transmission value) of the bandpass filter, which is suitable for the separation of the Stokes light, is expressed by the characteristics shown in FIG. 6 as follows:

$$\lambda_{s1} = \lambda_s - k1 \cdot \Delta\lambda_s$$

$$\lambda_{s2} = \lambda_s + k2 \cdot \Delta\lambda_s$$

$$k1 = -0.2 \sim +0.5.$$

$$k2 \geqq 0.2$$

In addition, the following expressions are suitable as the pass band ($\lambda_{a1}$, $\lambda_{a2}$) of the bandpass filter for effective separation of the anti-Stokes light.

$$\lambda_{a1} = \lambda_a - k2 \cdot \Delta\lambda_a$$

$$\lambda_{a2} = \lambda_a + k1 \cdot \Delta\lambda_a$$

$$k1 \doteqdot -0.2 \sim +0.5$$

$$k2 \geqq 0.2$$

A description will now be made on other Embodiments 10 through 16 of the present invention.

EMBODIMENT 10

Figure 14:
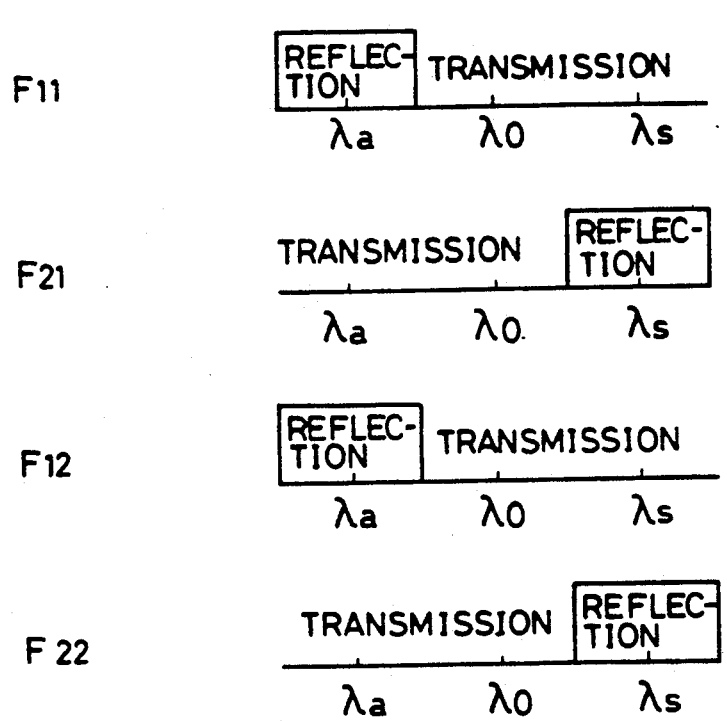
FIG. 14 is a set of views showing characteristics of an optical filter used in a tenth embodiment of the present invention.

In the above-described embodiment, the connecting port P3 is connected to the Stokes light measuring system and the connecting port P4 is coupled to the anti- Stokes light measuring system. However, even when the connecting port P4 is used as an alternative to the connecting port P3 connected to the measuring circuit for the Stokes light and vice versa, and the characteristics of the optical filters to be used are changed to those shown in FIG. 14, the same desired effects as those obtained in the previous embodiment can be anticipated.

EMBODIMENT 11

Figure 15:
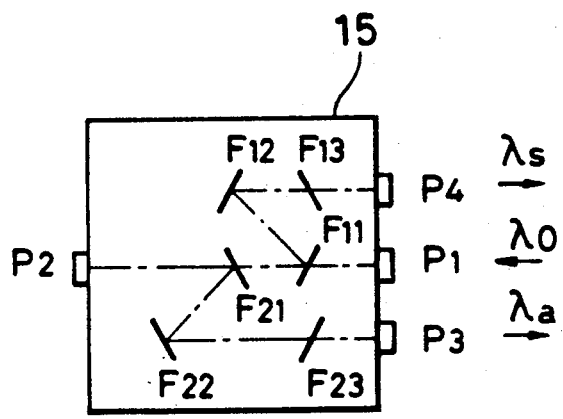
FIG. 15 shows an optical wave divider of an eleventh embodiment of the present invention.
Figure 16:
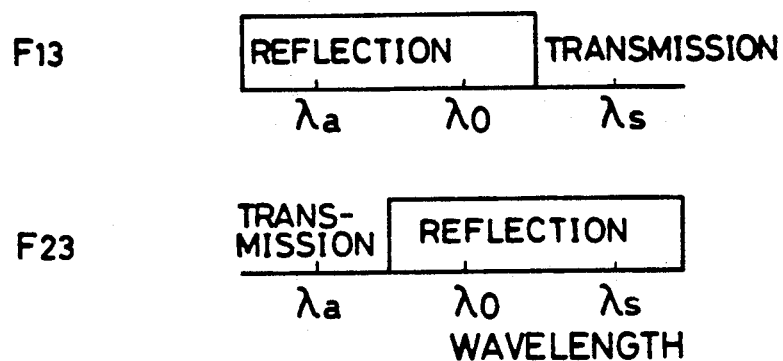
FIG. 16 is a set of views showing characteristics of optical filters used in the tenth and eleventh embodiments of the present invention.

As shown in FIG. 15, when a fifth filter F13 having the characteristic shown in FIG. 9 is additionally provided between the fourth filter F12 and the connecting port P4 or a sixth filter F23 having the characteristic depicted in FIG. 16 is additionally provided between the fourth filter F22 and the connecting port P3, or both of the fifth filter F13 and the sixth filter F23 are provided, in the structure of FIG. 12 as the ninth embodiment, the degree of eliminating capacity of light having the given wavelength λo, which is emitted from the light source and enters the measuring circuit 30s for the Stokes light connected to the connecting port P4, is raised, or the degree of eliminating capacity of light having the given wavelength, which is emitted from the light source and enters the measuring circuit 30a for the anti-Stokes light coupled to the connecting port P3 is increased, thereby making it possible to obtain a superb characteristic of the distribution temperature sensor of the optical fiber type.

EMBODIMENT 12

Similarly, in the above-described tenth embodiment, when optical filters having the same function as those employed in Embodiment 11 are additionally provided at the same positions as the fifth and sixth filters F13, F23 of FIG. 15, the degree of eliminating capacity of light having the given wavelength, which is emitted from the light source and enters the measuring circuit 30s for the anti-Stokes light and the measuring circuit 30s for the stoke light, both coupled to the connecting ports P3, P4, can be increased.

EMBODIMENTS 13-16

In addition to the combination of the used optical filters, the optical filters of a to e types shown in FIG. 10 may be used in combination as illustrated in FIG. 17. Two or three kinds of filter characteristics can be selected out of the filter characteristics shown in FIG. 10. It is however desirable to use the optical filters marked with asterisks (*) in the table in order to reduce, to the utmost, the degree of input of light having the given wavelength, which is emitted from the light source, into the light measuring system and the degree of entry of light having the given wavelength other than that having a certain wavelength to be measured into the light measuring system. However, there is a case where other filters may be preferred to those referred to above in connection with the manufacturing technique of the filters.

(B) ADJUSTMENT OF OPTICAL WAVELENGTH DIVISION DEMULTIPLEXER

Figure 18:
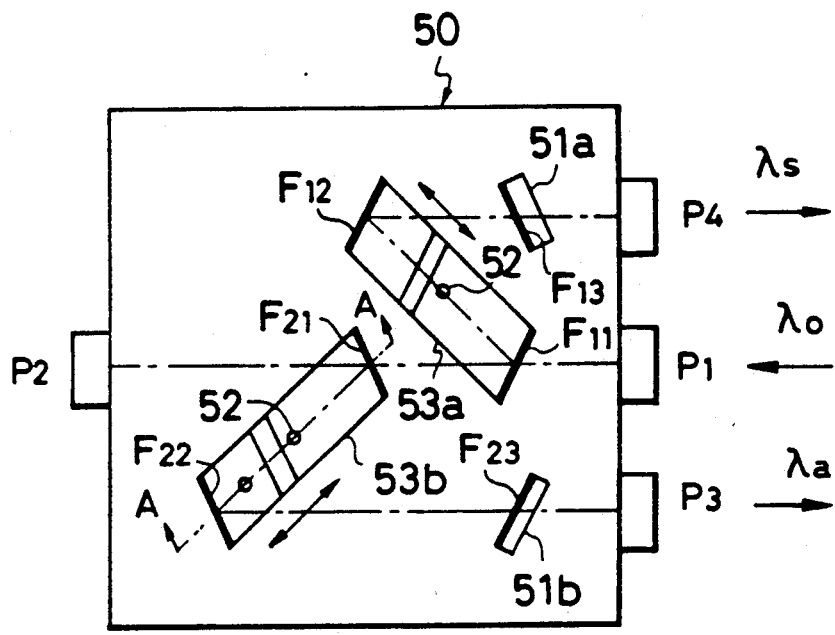
FIG. 18 shows an embodiment of the optical wavelength division demultiplexer of the present invention.

FIG. 18 shows an overall view of an optical wavelength division demultiplexer 50 including adjustment mechanisms.

The optical wavelength division demultiplexer 50 is fundamentally the same as the optical wavelength division demultiplexer 15 of FIG. 15, and includes connection ports P1, P2, P3 and P4 and optical filters F11, F12, F13, F21, F22 and F23. Characteristics of each optical filter employed are shown in FIG. 20. Also, the function of the respective connection ports P1 to P4 is the same as FIG. 1.

However, in the light dividing unit 15 of FIG. 1, it is important to adjust the filters and the positions and angles of the connection ports in a manner such that each filter performs its maximum characteristics and such that the connection ports are effectively connected. Therefore, the light branching unit 50 of FIG. 18 is associated with an angle adjusting mechanism and a distance adjusting mechanism.

First, the angle adjustment mechanism will be explained.

The optical filters F13 and F23, independent from other filters, are mounted on respective adjusting plates 51a and 51b and the adjusting plates 51a and 51b are mounted on the base of the wavelength division demultiplexer 50 in a manner such that the adjusting plates are rotatable, which makes it possible to adjust the optical axis of the filters.

On the other hand, a pair of optical filters F11 and F12, and another pair of optical filters F21 and F22 are also provided with the angle adjusting mechanisms, respectively. In this case, the following points have to be considered.

The optical filters F11 and F12, and F21 and F22 have a reflecting function. Therefore, the directions of the optical axis change upon rotation of the optical filters. Accordingly, the optical axes may considerably change their positions as they go far away, for example at the connection ports P1 to P4. Also, regarding a pair of optical filters F11 and F12 and another pair of optical filters F21 and F22, when F11 and F12 are separately rotated to adjust the angle with respect to the optical axis and at the same time to adjust the discrepancy or mismatching of the optical axis of the incoming and outgoing lights passing through the optical filters, a number of combinations of rotation amount and rotation direction are possible. This means that in an actual case, it is almost impossible to find the best combination by a trial-and-error approach.

Therefore, the angle adjusting mechanism changes the axis with respect to the optical path while not changing the angles between two optical filters for each pair. Specifically, the optical filters F11 and F12 are treated as one set and the optical filters F21 and F22 as another set, and the approximately same filters F11 and F12 are mounted parallel to each other on the adjusting plate 53a and likewise the approximately same filters F21 and F22 are mounted parallel to each other on the other adjusting plate 53b. The adjusting plates 53a and 53b are rotatable with the circles 52 being the rotation centers (FIG. 18). The two filters (F11 and F12, or F21 and F22) are simultaneously adjusted.

With this angle adjustment mechanism, the axis of incoming light and the axis of outgoing light passing through these two filters are only changed in position, with the directions being unchanged, so that the adjustment becomes easier.

However, the position mismatching of the axis of the incoming and outgoing lights due to the rotation includes the reflection between two spaced filters. Therefore, the position mismatching is much larger than in a case of passing through only one thin filter. Accordingly, it is required to adjust the positions of the connection ports P3 and P4 or other elements.

Thereupon, there is employed an adjustable mechanism at the pick up portion of the main body of the light dividing device as well as at the connection ports P1 to P4. Specifically, first, the connection port P1 is fixed, then, the connection ports P2 to P4 are provided in turn and the filters F13 and F23 as well as a pair of F11 and F12 and a pair of F21 and F22 are temporarily fixed, then; the angles and locations of the filters F11–F12, F21–F22 and P2 are adjusted in a manner such that the incoming light λo from the connection port P1 is most effectively emitted from the connection port P2, whereas the filters F11 and F12 are adjusted in a manner such that the λo component does not go out from the connection ports P3 nd P4. After that, the filters F11–F12, F21–F22, F13 and F23 are adjusted in a manner such that the incoming light λs from the connection port P2 is most effectively emitted into the connection port P4. A similar adjustment is done to the light λa coming from the connection port P2 to be emitted into the connection port P3.

During the successive adjustments, the next adjustment spoils the previous adjustment and the adjustment process has to be repeated several times. A very careful adjustment process using a prototype gave the following results with respect to a coupling efficiency: P1→P2, 55%; P2→P3, 45%; and P2→P4, 40%. These values are smaller by 10% respectively than the values of a case where adjustments are separately performed at each connection port.

Next, a distance adjustment will be explained.

The angle adjusting mechanism is not enough since there are too may factors to be adjusted and the adjustment satisfying all the requirements is almost impossible. When the coupling efficiency at the optical wave dividing device and the optical wavelength division demultiplexer is bad, S/N ratios of the anti-stokes light and Stokes light, which are originally small, become worse. As a result, the improvement of S/N by the averaging circuit becomes difficult, which lowers the accuracy of the temperature distribution detection.

One reason why the adjustment, as a whole, is difficult is that, although each pair of two filters are rotated together and there is no discrepancy in the optical axis directions, the discrepancy of the optical axis position is large and a subtle adjustment of position for absorbing and adjusting the large discrepancy, at the plane on which the connection ports are mounted, is difficult and complicated. Another reason is that the incident angle of the optical axis at the plane on which the connection ports are mounted changes slightly and the coupling is deteriorated.

Figure 19:
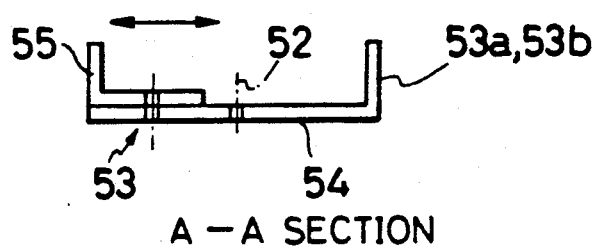
FIG. 19 is a sectional view of a distance adjusting mechanism of the optical wave divider of FIG. 18.

Thereupon, there is provided the distance adjusting mechanism 53 which changes the distance between two facing optical filters without changing a relative angle between the two facing optical filters. Specifically, as shown in FIG. 19, the adjusting base 53a and 53b holding these two optical filters is constituted by two elements, i.e., a base 54 and a movable portion 55, and the movable portion 55 is provided in a manner such that the movable portion 55 is slidable relative to the base 54 only in one direction as indicated by the arrow.

With the distance adjusting mechanism, the following adjustment is possible: the adjustment of the adjusting base 53b fixing the optical filters F21 and F22 adjusts the angle of the optical filters using the rotational adjusting mechanism, and then the distance between the optical path (P2→F21) incoming to the optical filter F21 and the optical path (F22→F23) outgoing from the optical filter F22 (the optical paths have parallel discrepancy due to this rotational adjustment) is adjusted by moving the movable portion 55 in the direction indicated by the arrow to put them in place. This can be said to be the adjustment of the adjusting plate 53a holding the optical filters F11 and F12.

Therefore, it is possible to maintain the distance between the optical axes of the incoming/outgoing lights to/from the two optical filters mounted on the adjusting plates 53a and 53b, regardless of how the rotational adjustment of the adjusting plates 53a and 53b are performed.

A coupling adjustment was conducted to the optical wave dividing device having the angle adjusting mechanism and distance adjusting mechanism, and the following coupling efficiencies were obtained: 65% from the connection ports P1 to P2; 55% from P2 to P3; and 50% from P2 to P4. These data are nearly equal to the coupling efficiencies obtained by separate adjustments for each optical path. This means that the coupling efficiency is adequately small.

In FIG. 19, in order to fix the movable portion 55 after it is moved in the direction of the arrow, a protuberance may be formed on the bottom face of the movable portion 55 and a recess which will engage the protuberance may be formed in the top face of the base 54, or guide members may be provided on the movable portion 55 and/or the base 54 along both sides thereof such that the movable portion 55 is slidably guided on the base 54.

Also, bolts and nuts as well as bores for the bolts may be provided and formed to fix the movable portion 55.

Since the angular adjustment by simultaneous rotation of two filters which are mounted on a single mutual adjusting plate is possible and the distance adjustment (the distance between two filters on the mutual plate) is possible, the coupling adjustments between the connection ports P1 and P2, P2 and P3, and P2 and P4 become easy and the coupling efficiency is improved.

(C) IMPROVEMENT OF DISTANCE RESOLVING POWER

Meanwhile, the reflected light detected by the above-mentioned temperature distribution sensor (FIG. 1) is generally the back scattered light and returns to the incident end with a time delay in the longitudinal direction of the optical fiber. In order to raise the resolving power in the longitudinal direction of the information, the returned back scattered light undergoes a sampled-data processing with short time intervals, after light/electricity conversion.

If the wavelength difference of the wave components to be detected is slight enough, the velocity for each wavelength is almost equal to the velocity for another. Therefore, if the length of the optical fiber to be detected is short, the back scattered lights from the same place return at approximately equal times, regardless of the wavelength, so that there is little problem in measuring.

However, if there is a large difference in the wavelengths to be detected, the transmission rates or velocities are different from each other. Therefore, in order to obtain the information of temperature at the same place, sampled-data processing is required with time intervals corresponding to the transmission rates of the respective wavelengths.

For example, assuming that the transmission rate of the incident light from the light source is Vo, the transmission rate of one component a of the back scattered light is Va, the optical signal intensity of the same component a is Ia, the transmission rate of another component b of the back scattered light is Vb, the optical signal intensity of the just-mentioned component b is Ib, the distance to the point on the optical fiber to be measured is x and the time elapsing after the pulse light enters the optical fiber is t, the two components a and b of the back scattered light from the point x return to the incident end after the times ta and tb elapses respectively. In this case, the times ta and tb are given by following equations:

$$ta = x/Vo + x/Va = x(1/Vo + 1/Va)$$

$$tb = x/Vo + x/Vb = x(1/Vo + 1/Vb)$$

Supposing that the wave a is sampled at the time ta, its optical signal intensity is expressed by Ia(ta) and this is the sample information at the distance x, the value Ib(ta) which is sampled at the same time, is considered as the sample information not at the distance x but the distance $x (1/Vo+1/Va)/(1/Vo+1/Vb)$, according to the above relationship.

Therefore, in order to obtain accurate sample information about the optical signal intensity Ib of the wave b at the distance x, it is necessary to sample not by ta but by tb', which is given below:

$$tb' = ta(1/Vo + 1/Vb)/(1/Vo + 1/Va)$$

If an ideal sampling process is possible, the wave a is sampled with the time intervals Δta and the wave b is sampled with the time intervals Δtb. This makes it possible to obtain the information at the distance x for both waves using ta and tb'.

However, there is a problem in an actual detecting system.

For example, a case where Vo=200 m/μs, Va=201 m/μs, Vb=198 m/μs and the sampling interval=20 ns is taken. In this case, the sample information of every 2.004987 - - - m interval are obtained corresponding to the sampling order 1, 2, 3, - - -, i, - - -, N. When the wave b is processed by the same sampling interval, the sample information of every 1.989949 - - -m interval is obtained, almost 2 m in either case. Therefore, when a certain physical value information F is calculated using the data Ia and Ib, it seems that the value information F is the information is within an allowance of 2 m intervals.

Also, when the 50th sample information of the waves a and b is used, the obtained data for the wave a is a data at the distance 100.24935 m whereas the obtained data for the wave b is a data at the distance 99.49745 m. In a particular case, there is no problem to calculate the physical information value F using these data.

However, the distance for the wave a is 1002.49 m≈1002 m and the distance for the wave b is 994.97 m≈995 m when the 500th sample information is used. The physical information data obtained using these two distances, which are different from each other by about 7 m, are the meaningless data. Ideally, Δtb is given by a following equation:

$$\Delta tb = \Delta ta(200 + 201)/(200 + 198)$$
$$= (20.15075 \text{ ---})$$

When such a time control is performed by a digital circuit, the pulse signal of 0.00001 ns has to be counted and then the waves a and b are sampled at each counting number of 2,000,000 and 2,015,114. To do this, however, it is necessary to prepare a high frequency circuit which can control 0.00001 ns. This is not practical. In addition, the optical fiber has to possess a length of about 17.7 km, in order to count with the pulse of 0.01 ns and to maintain or suppress the difference between the waves a and b within 1 m.

In summary, in order to detect the physical information, using a plurality of wavelengths, with the accuracy of the detection position and the information being maintained adequately, a very accurate and severe control is necessary to the sampling timing. The transmission rates of respective wavelengths have to be also taken in account in such a case. This control is almost impossible with respect to expense and technique.

Furthermore, even if a certain control is conducted to the system, a distance error appears when the optical fiber extends beyond a particular length, so that it is impossible to cover the entire optical fiber.

Moreover, a more serious problem is assumed because of errors in the sampling timing control and other negative factors such as the change of wavelength of the OTDR light source due to environmental factors, for instance, change of atmosphere temperature.

The following passages deal with a temperature distribution sensor arrangement which detects a plurality of waves using the distance having an error within an allowance, in a possible manner.

Figure 21:
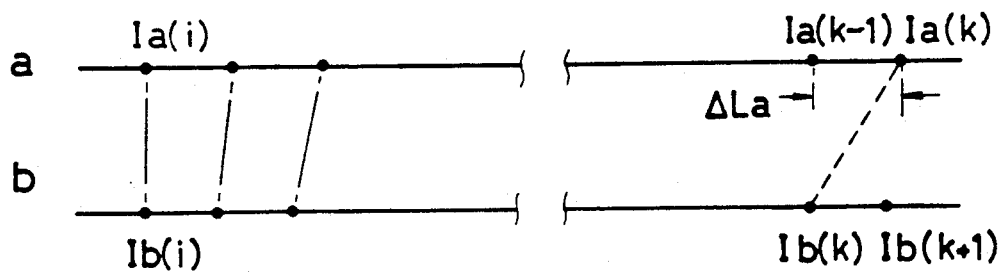
FIG. 21 is a view useful to explain a case where signals at different positions are received when wavelengths of backward scattered light are different, even if they are sampled at the same timing.

FIG. 21 shows a case where a plurality of waves (two waves) are received and the time change is converted into the position change.

Both waves are sampled at the same timing, but data of a longer interval is obtained for the wave a whose transmission rate is faster than that of the wave b.

Conventionally, the i-th data of the wave a and the i-th data of the wave b are picked up to calculate Ia(i) and Ib(i) and then to obtain S(i).

However, as shown in the right side of FIG. 21, when the data at the point k which is far from the point i are used to calculate Ia(k) and Ib(k), the obtained S(k) is data using data at a point not k but k−1 with respect to the wave a, which is different from a data at the point k by the sampling time interval for the wave a, i.e., ΔLa. Theoretically, S(k−1) has to be obtained using Ia(k−1) and Ib(k).

In order to realize this, it is necessary to explain two cases: one case where the transmission rates Va and Vb of the waves a and b are already known respectively and the other case where these rates are not known.

(1) Where Va and Vb are known

If the transmission rates Va and Vb are different but constant values, the following two approaches (i) and (ii) are available.

Figure 22:
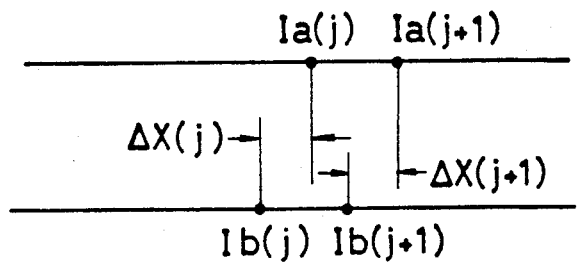
FIG. 22 shows an example of how to pick up signals at the approximately same positions among signals received.

(i) To select signals sampled, based on the magnitude of s:

Specifically, as shown in FIG. 22, until the distance difference Δx(j) between Ia(j) (Ia at the j-th position) and Ib(j) (Ib at the j-th position) satisfies an equation:

$$\Delta x(j) < \Delta La/2,$$

Ia(j) and Ib(j) are used, and after that, i.e., when $$\Delta x(j+1) \geqq \Delta La/2,$$

Ia(j) and Ib(j+1) are used.

In these cases, two S(j)s at the same distance j are obtained. One of them is chosen or the average of the two S(j) is used, in accordance with occasional factors.

Thereafter, a combination of Ia(j+1) and Ib(j+2) is repeatedly used to obtain S(j+1). When Δx of this combination becomes equal to or more than ΔLa/2 again, the used data are shifted by one.

Generally, the above-mentioned process is repeated for each distance of about 2j·ΔLa/2 such that the distance difference between Ia and Ib used to obtain S is not affected by the length of the optical fiber and such that the difference remains within ±ΔLa/2.

In the above explanation, the distance difference of ΔLa/2 is considered with the wave a being the reference. However, the distance difference ΔLb/2 may be considered with the wave b being the reference. In this case, Ib(j+1) and Ia(j) are used when the situation reaches $\Delta x(j+1) \geq \Delta La/b$, so that S can be obtained with the distance difference of ±about ΔLb/2 for each ΔLb.

In a case where the distance difference corresponding to one sampling interval is produced on the optical fiber due to the rate difference, i.e., when the optical fiber is too long, in obtaining signals from a plurality of waves received as described above, when the distance difference becomes equal to or more than one-half of the distance corresponding to one sampling interval for the reference wave, a desired detection which does not have a large distance difference between the signal positions of two waves is realized by using the data of the faster wave twice. The distance to be compared with Δx is chosen, depending on the object of detection, from a value within ΔLa or ΔLb.

(ii) To convert signals of the wave b sampled with the distance intervals different from the wave a, into signals of the same distance intervals, with the sampling of the wave a being main:

Specifically, an integral number j' which does exceed (j·ΔLa)/ΔLb is obtained and the following equation is calculated.

$$Ib(j') + \{Ib(j'+1) - Ib(j')\}(j \cdot \Delta La - j' \cdot \Delta Lb)/Lb$$

This calculation means that Ib corresponding to a position of j La is obtained by interpolation using Ib(j'+1) and Ib(j') which is the data at a position closest to Ib(j).

The same technique can be applied to a case where the signal of the wave b is considered main.

(2) Where Va and Vb are unknown or are not constant

When the transmission rates Va and Vb are not clearly grasped or when the wavelengths λa and λb change during operation which in turn changes the transmission rates, Δx, $SL/2 and the sampling number j whose magnitude changes are unknown. Therefore, a certain treatment is necessary.

In the above cases, the following measures are taken.

Figure 23A:
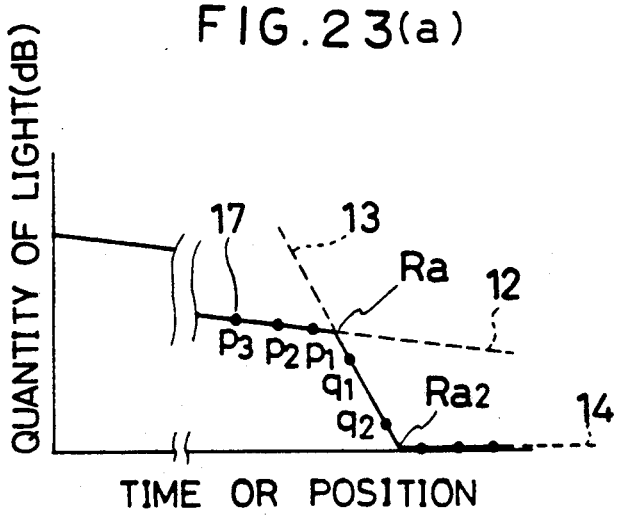
FIGS. 23a-b is a set of views showing a concrete technique of how to obtain signals from a free end of an optical fiber.

When the far end (free end) of the optical fiber is open, the scattered light from a place further than the far end is no longer transmitted backward. Therefore, the signals of the backward scattered light having the wavelengths λa and λb, as one example being shown in FIG. 23 (a), drop dramatically beyond the far end position. Accordingly, it is easily possible to know the far end position by capturing the turning point of the sampling data 17 (black dots in the illustration).

For example, the far end is grasped in follwong manners.

(i) Major sampling points $p_1$, $p_2$, $p_3$, which are meaningful as the signals and sampling points $q_1$, $q_2$, $q_3$, which decline dramatically toward the measuring limit, are approximated by linear lines 12 and 13 respectively and the crossing point $R_{a1}$ of the lines 12 and 13 is picked up as the far end Ra.

(ii) The measuring limit is approximated by a line 14 and the middle point between the crossing point $R_{a2}$ of the lines 14 and 13 and the point $R_{a1}$ is picked up as the far end Ra.

Figure 23B:
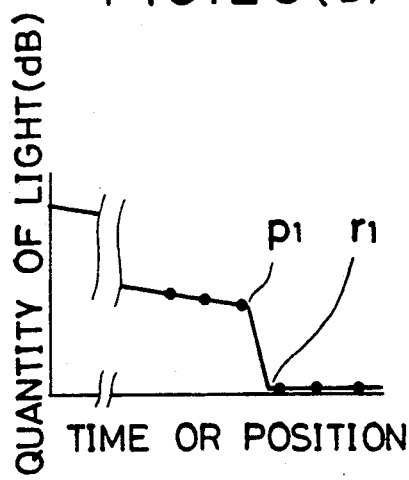

(iii) As illustrated in FIG. 23(b), the middle point of the line connecting the point $p_1$, which is the meaningful end point signal, with the start point $r_1$ of the measuring limit is picked up as the far end Ra.

The far end Ra of the wave a is obtained by the above-described mathematical approximation techniques and the time corresponding to the far end point Ra is taken as ta(Ra). The above-mentioned approximations are selectively used in accordance with the wave shape of the incident pulse light, the sampling time interval, the allowance and other factors. Also, the time tb(Rb) corresponding to the far end point for the wave b is obtained by similar manners.

When the wave a is faster than the wave b, the signal of the wave a returns earlier than the signal of the wave b, even though they are from the same far end point, which results in ta(Ra)<tb(Rb). Also, if the samplings are conducted with the same interval τ, the wave a is smaller than the wave b in the number of samplings between the entrance and the far end.

With ta(Ra) and tb(Rb) being equal to each other, or with the number sampled just therebefore being Na and Nb, $$ta(Ra) = Na \cdot \tau + \Delta ta,$$

$$tb(Rb) = Nb \cdot \tau + \Delta tb.$$

(a) Where the distance L of the optical fiber is known

Approximate values of the transmission rates Va and Vb are obtained from

2L/ta(Ra) and

2L/tb(Rb).

After the transmission rates Va and Vb are obtained, the technique (i) is used.

For a particular detection object, Δta and Δtb are neglected and the transmission rates Va and Vb are obtained from a ratio of Na and Nb.

(b) Where the accurate distance L of the optical fiber is unknown

When the accurate distance L of the optical fiber is not known, an approximate value is estimated to obtain relative transmission rates. Thereupon, the above-described techniques can be applied.

In any case, a certain information S is obtained from the signals of both wavelengths at the same points. This matches the object of the present invention.

However, the accuracy of the signal positions has an error corresponding to the ratio of the accurate distance of the optical fiber and the estimated distance of the optical fiber. This problem is eliminated by measuring the distance of the optical fiber beforehand, or by giving known information to the optical fiber at a known distance from the incident end and then obtaining data detected by the temperature distribution sensor to compensate the distance.

(c) Where part of Fresnel reflected light is received as back scattered light

The above-described cases are cases where the far end or a portion corresponding to the far end is acquired from the back scattered light of respective wavelengths. However, in these cases, a part of Fresnel reflected light which is produced at the far end cut portion is received as the back scattered light after the light is input, because (1) the wavelength components diversify, (2) the difference between the input light and the back scattered light is insufficient and (3) the characteristics of the light divider (the optical wavelength division demultiplexer) for separating the received back scattered light are not decent.

Figure 24A:
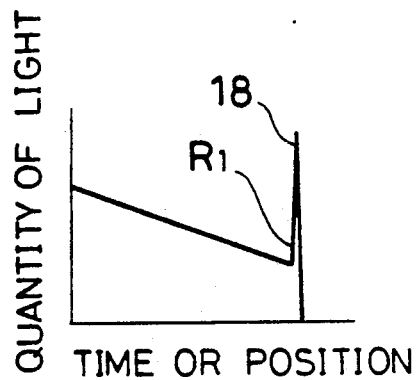
FIGS. 24a, 24b and 24c are a set of views showing a technique of how to know the free end when the back scattered light near the free end and the Fresnel reflected light return within a short time interval.
Figure 24B:
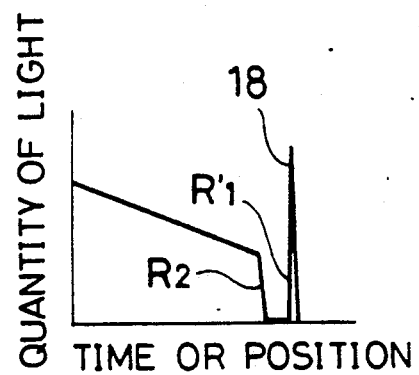
Figure 24C:
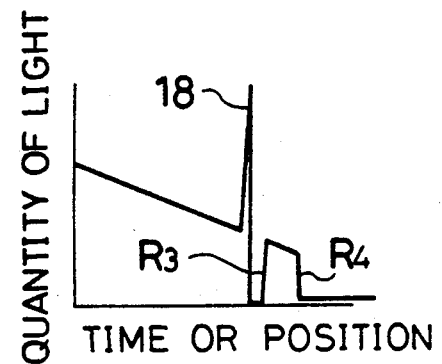

In this case, as one example being shown in FIG. 24, Ra and Rb are obtained from the sharply upwardly bent portion R1 due to the Fresnel reflected light 18 (FIG. 24(a)), the reaching point R1' of the Fresnel reflected light 18 and the sharply declined portion R2 just before the reaching point R1' (FIG. 24(b)), or the second sharply raised portion R3 of the slow scattered light which reaches after the Fresnel reflected light 5 or the sharply declined portion R4 (FIG. 24(c)).

(d) Where Fresnel reflected lights overlap

When the Stokes light and the anti-Stokes light of the input light are used as the backward scattered light of plural wavelengths, the Rayleigh backward scattered light having the intermediate wavelength and the Fresnel reflected light 18 of the input light are received overlapping at the same wavelength. However, the stokes light is longer and faster than the Rayleigh scattered light in wavelength and transmission rate. Therefore, it is possible to obtain the far end using this. For example, a following process is performed: referring to FIG. 24(b), the difference between the suddenly dropping portion R2 and the suddenly rising portion R1' due to the Fresnel reflected light 18 which reaches thereafter is obtained and then the difference between the anti-Stokes light and the Stokes light is treated as being twice of the just-mentioned difference. In this manner, first, the far end for a part of the plural waves is obtained, and then the far ends for the lights having other wavelengths are obtained from the relative relation between the transmission rates and the already known wavelengths.

In the above explanation, for easier understanding, everything is explained using the distance or position. However, by use of the relationship with the transmission rates of the lights, sampling timing and sampling numbers, the above process can be conducted using the time or sampling numbers to obtain the accurate, distribution of data including accuracy of distance and position, distribution of data.

(D) TEMPERATURE MEASUREMENT AT OPTICAL FIBER END (1)

Figure 25:
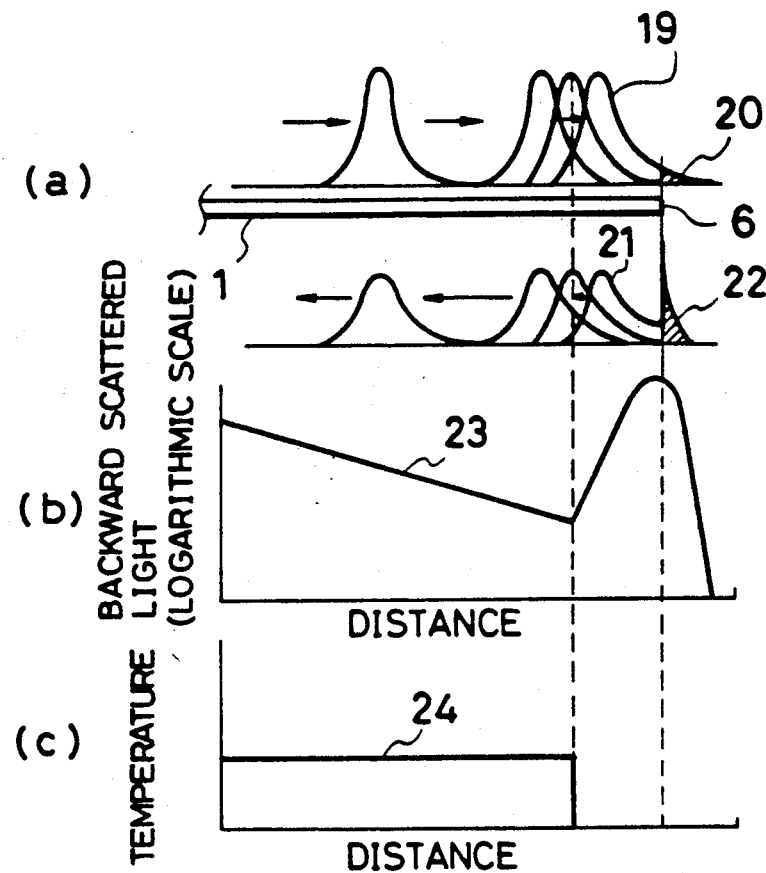
FIGS. 25a, 25b and 25c are a set of views useful to explain an operation of a conventional fiber optic temperature distribution sensor arrangement.

With the fiber optic temperature distribution sensor arrangement described in FIG. 1, when the front of the wave of the optical pulse coming into the optical fiber from the light source 4 is relatively long, since the wave front 20 of the transmitted light pulse 29 reaches the far end of the optical fiber at first, as shown in FIG. 25, a reflected component 22 which is extremely larger than the back scattered light pulse component 21, relative to the optical power of the wave front 20, is produced before the peak reaches the far end, and this is superposed to the back scattered light component prior to returning to the incident end.

Therefore, the back scattered light distribution obtained by sampling possesses a waveform indicated by numeral 23. Due to the unstable reflected component at the far end, the temperature distribution 24 obtained from this distribution 23 becomes shorter than the length of the optical fiber and the temperature near the far end cannot be obtained quite often.

In order to eliminate this problem, the light pulse having a short wave front has to be introduced. However, it is a very difficult technique to realize this using a high output pulse which is necessary for detecting the scattered light with good S/N. Thus, the temperature distribution near the far end is not generally used as the measured value.

However, when a temperature at a narrow place, in a pipe or of a clearance between buildings of complicated shape has to be measured, usually the optical fiber is inserted into such a place. In most cases at this situation, the free end (far end) of the optical fiber is the point nearest to the object to be measured. As mentioned above, however, since the data of the temperature distribution near the free end of the optical fiber is not reliable, the temperature distribution sensor loses its meaning.

The following passages deal with a fiber optic temperature distribution sensor arrangement which can measure the temperature distribution even near the free end of the optical fiber (sensor).

Figure 26:
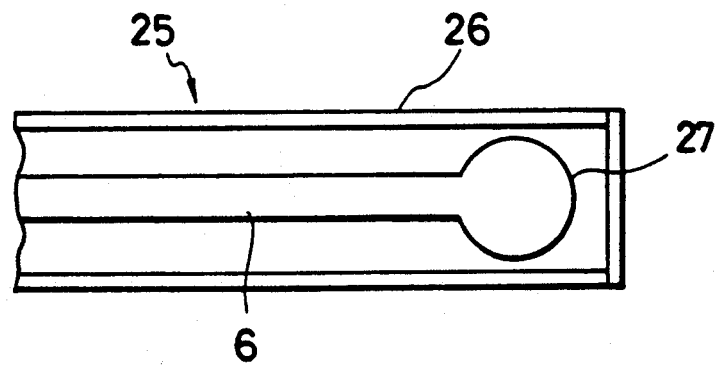
FIG. 26 is a sectional view showing the free end of of the optical fiber of the fiber optic temperature distribution sensor arrangement.

Referring to FIG. 26, the sensor optical fiber 6 is sealingly inserted in a protecting tube 25 which is to be inserted in an object. The protecting tube 25 may be a metallic tube or a plastic tube. Numeral 27 designates the free end of the optical fiber 6 and the free end 27 has been subjected to the nonreflective treatment. In this embodiment, the free end 27 is shaped spherically as a result of the nonreflective treatment.

Figure 27:
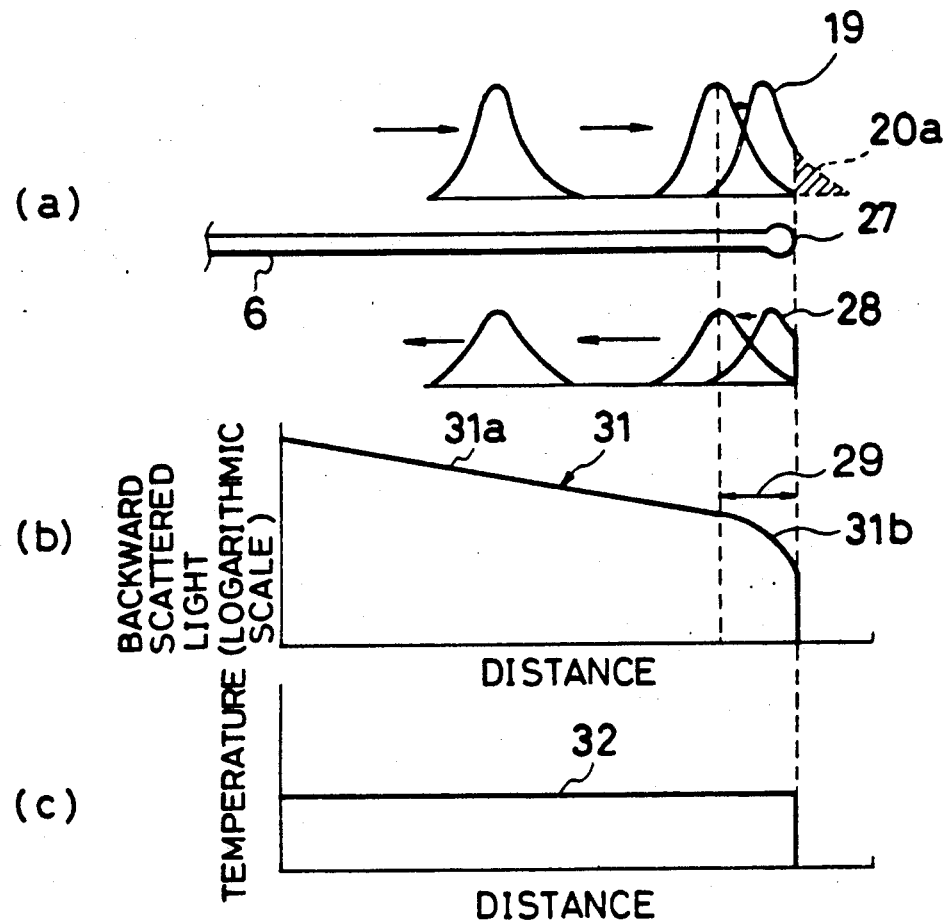
FIGS. 27a, 27b and 27c are a set of views useful to explain an operation of the fiber optic temperature distribution sensor arrangement of the present invention.

Referring to FIG. 27, the light pulse coming from the light source (FIG. 1) into the optical fiber 6 propagates through the optical fiber 6 while producing Raman backward scattered light. The transmitted light pulse 19 propagates to the free end 27 of the optical fiber. Since the free end 27 is spherical and nonreflective, the wave front 20a of the transmitted light pulse 19 passes therethrough to the outside, and at this point the backward scattered light pulse 28 returning to the incident end does not include the reflection component at the free end (FIG. 27). Therefore, with respect to the transmitted light pulse 19, the backward scattered light component generated from the portion without the wave front 20a returns to the measuring system.

Thus, the backward scattered light distribution 31 obtained by the OTDR technique at the incident end of the optical fiber 6 has a configuration shown in FIG. 27. Specifically, all of the transmitted light 19 is in the optical fiber, and during the transmission area it is indicated by a line 31a having an inclination of logarithmic scale based on the optical fiber loss whereas during an area 29 (optical fiber end area) after the wave front 20a is transmitted outside, it is indicated by a curve 31b whose inclination gradually drops or whose level drops.

The back scattered light distribution 31a at the free end area 29 of the optical fiber, as described above, has a distribution whose inclination changes slowly and downwardly. This distribution does not include unstable factors which may change with the situation of the reflection face like the reflected light component, and is determined by the scattered light produced by the transmitted light pulse 19 based on the energy component existing in the optical fiber 6.

Accordingly, when the temperature distribution sensor which obtains temperature from the distributions of two components of Raman back scattered light, namely the antistoke light and the stoke light, the two scatted lights at the free end area 29 have the same distribution as indicated by numeral 31b in FIG. 27. The temperature distribution obtained by computing them has a high accuracy all along the optical fiber even at the free end of the optical fiber 6, as depicted by the line 32 in FIG. 27.

In the foregoing description, the free end 15 of the optical fiber 6 is made spherical. However, the free end 15 may be sealingly covered with a material having a high refractive index to have a nonreflective portion.

This temperature distribution sensor arrangement is advantageous in terms of cost since the nonreflective treatment is very simple.

(D) TEMPERATURE MEASUREMENT AT OPTICAL FIBER END (2)

As mentioned above, the fiber optic temperature distribution sensor arrangement can cope with the temperature distribution measuring in the longitudinal direction of the sensor optical fiber but has difficulty in measuring the temperature near the free end (tip or far end) of the sensor optical fiber.

Figure 28:
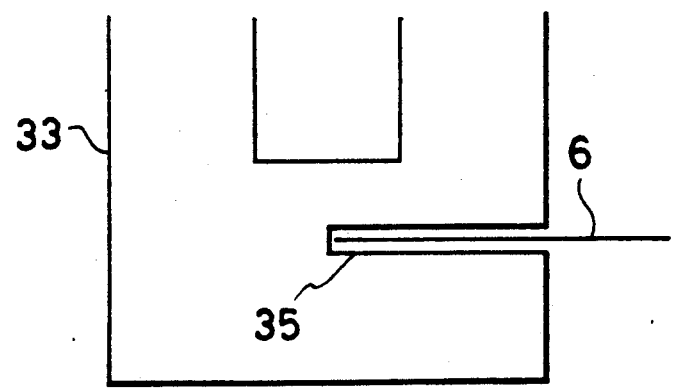
FIG. 28 is a prespective view of an object to be measured.

For example, as shown in FIG. 28, when the optical fiber 6 is disposed in a guide tube 34 of the object 33 and the temperature at the free end of the optical fiber 6 and the temperature distribution at the intermediate area of the same are to be measured at the same time, the latter (temperature distribution) can be measured but the former (temperture at the free end) cannot be detected due to an influence of Fresnel reflection.

The following passages also deal with an optical fiber type temperature distribution sensor which can detect the temeprature at the free end of the optical fiber.

Figure 29B:
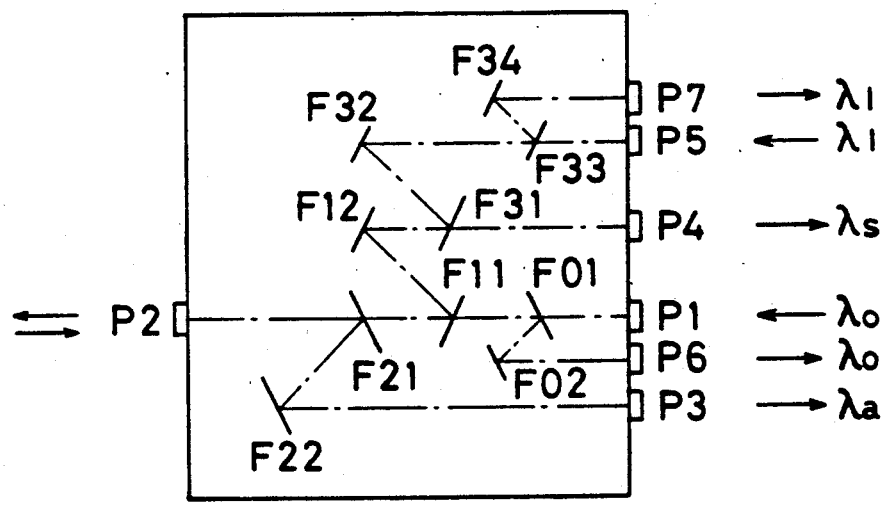
FIG. 29 (A) is a block diagram of the optical fiber type temperature distribution sensor arrangement according to the present invention.

An optical fiber type temperature distribution sensor of FIG. 29 is fundamentally the same as the one of FIG. 1. A construction diagram of the optical wavelength division demultiplexer is shown in FIG. 29(B). The characteristics of the optical filters used in the optical wavelength division demultiplexer is shown in FIG. 29(C). The characteristics of half transmission means that, for example, the transparency is 50% and the reflectivity is 50%. Also, another pair of values of transparency and reflectivity can be used according to the usage.

In FIGS. 29(A) and 30, a GaAs sensor 35 is provided at the free end of the optical fiber 6. GaAs has a sharp optical absorption range and allows the light having a wavelength longer than the wavelength at the end of the absorption range to pass therethrough while absorbing the light having a wavelength shorter than the same. The end of the absorption range changes in wavelength by temperature change of the GaAs (it moves the longer wavelength forward when the temperature goes high). Therefore, the temperature can be measured by taking a ratio of the light having a short wavelength near the wavelength at the end of the absorption area of GaAs and the light having a long wavelength apart from the wavelength at the end of the absorption area.

Specifically, as shown in FIG. 30, the GaAs sensor 35 is constructed by mounting GaAs 36 on the free end of the optical fiber 6, mounting a reflection film 37 on GaAs 36, housing them by a holder 38 and fixing them with a spacer 39. The light having wavelengths passing through the GaAs 36 is reflected by the reflection film 37 and introduced into the optical fiber 6 as the reference light.

Provided as the pulse light source 4 are two laser beam sources 40 and 41 which are driven by pulse drive circuits 42 and 43 respectively. The laser beam source 40 includes a laser diode LD producing a short wavelength laser beam, i.e., a laser beam having a wavelength near the end wavelength of the absorption range of GaAs and is used in measuring the temperature distribution. The laser beam source 41 includes a laser diode LD producing a long wavelength laser beam, i.e., a laser beam having a wavelength apart from the end wavelength of the absorption area of GaAs and is used as the reference light in measuring the temperature distribution.

The light pulses emitted from the laser sources 40 and 41 driven by the pulse drive circuits 42 and 43 are guided into the optical fiber 6 via the wavelength division demultiplexer 15. Part of the back scattered light produced by the light pulse of the laser beam source 40 returns, in the order of how close to the incident side (left in the illustration), from respective positions on the optical fiber 6 toward the incident side. In the GaAs sensor 35 at the free end of the optical fiber, particularly, the light having a short wavelength is absorbed by the GaAs 36 and the light having a wavelength longer than the end wavelength of the absorption area GaAs (reference light) is transmitted and then reflected by the reflection film 37 before returning into the optical fiber 6. In other words, the light of the first laser beam source 40 is absorbed by the GaAs 36 so that the reflected light is reduced. On the other hand, the light of the second laser beam source 41 is not absorbed by the GaAs 36 so that the reflected light is constant.

Two components of Raman scattered light (the Stokes light and the anti-Stokes light) among the lights obtained from ports P3 and P4 of the wavelength division demultiplexer 15 are guided into light receiving devices (detectors) 9a and 9b and the detection signals thereof undergo an averaging process performed by a high speed averager 10 and then a computation process performed by a temperature distribution computing circuit (data processing unit) 11.

Rayleigh scattered light produced by the short wavelength laser beam source 40 among the lights obtained from the port P6 is guided into the light receiving device (detector) 46. The reference light of the long wavelength laser beam sorce 41 among the lights obtained from the ports P4 is guided into the light receiving device (detector) 47.

As described above, the light receiving device 46 detects Rayleigh scattered light generated by the short wavelength laser beam source 40 and the light receiving device 47 detects the reference light of the GaAs sensor 35 by the long wavelength laser beam source 41, and the detection signals thereof are guided into the temperature distribution computing circuit (data processing unit) 11. Since Raman scattered light is a very weak light, the detection signals of the light receiving devices 9a and 9b are subjected to the averaging process by the high speed averaging unit 10 to eliminate random noises and to improve an S/N ratio, whereas the light of the laser beam source 41 and Rayleigh scattered light do not require such processes, so that the detection signals of the light receiving devices 46 and 47 are immediately input into the temperature distribution computing circuit 11.

The temperature distribution computing circuit 11 computes the temperature distribution from two detection signals of the light receiving devices 9a and 9b. Also, the temperature distribution computing circuit 11 calculates a ratio of two detection signals of the light receiving devices 46 and 47 and then computes the temperature at the free end of the optical fiber 6. The ratio is calculated due to a following reason. The light transmitted through the optical fiber 6 is reflected by the GaAs sensor 35 at the free end and then transmitted in the optical fiber 6. In this situation, the light of the laser beam source 40 is absorbed by the GaAs 36 and accordingly the reflected light is reduced. On the other hand, since the light of the laser beam source 41 is not absorbed by the GaAs 36, the reflected light is constant. The light having a wavelength near the absorption end wavelength of the GaAs sensor 35, i.e., Rayleigh scattered light, is detected by the light receiving device 46 and the reference light of the GaAs sensor 35 is detected by the light receiving device 47, and then temperature is calculated from a ratio of intensities of these two lights. The temperature distribution computed is displayed on a display 16.

As described above, the detection of the temperature at the free end of the optical fiber (sensor) is made possible (which detection is conventionally impossible). Also, the temperature distribution measuring system which is already used in a certain facility can be used with only minor modifications, so that an inexpensive system can be provided. Since the optical, free end sensor including GaAs and reflection film is used, the free end sensor does not require electricity for its movement and there is no influence of the surging and external noises. A continuous monitoring of the object is made possible by the free end sensor.

Figure 31:
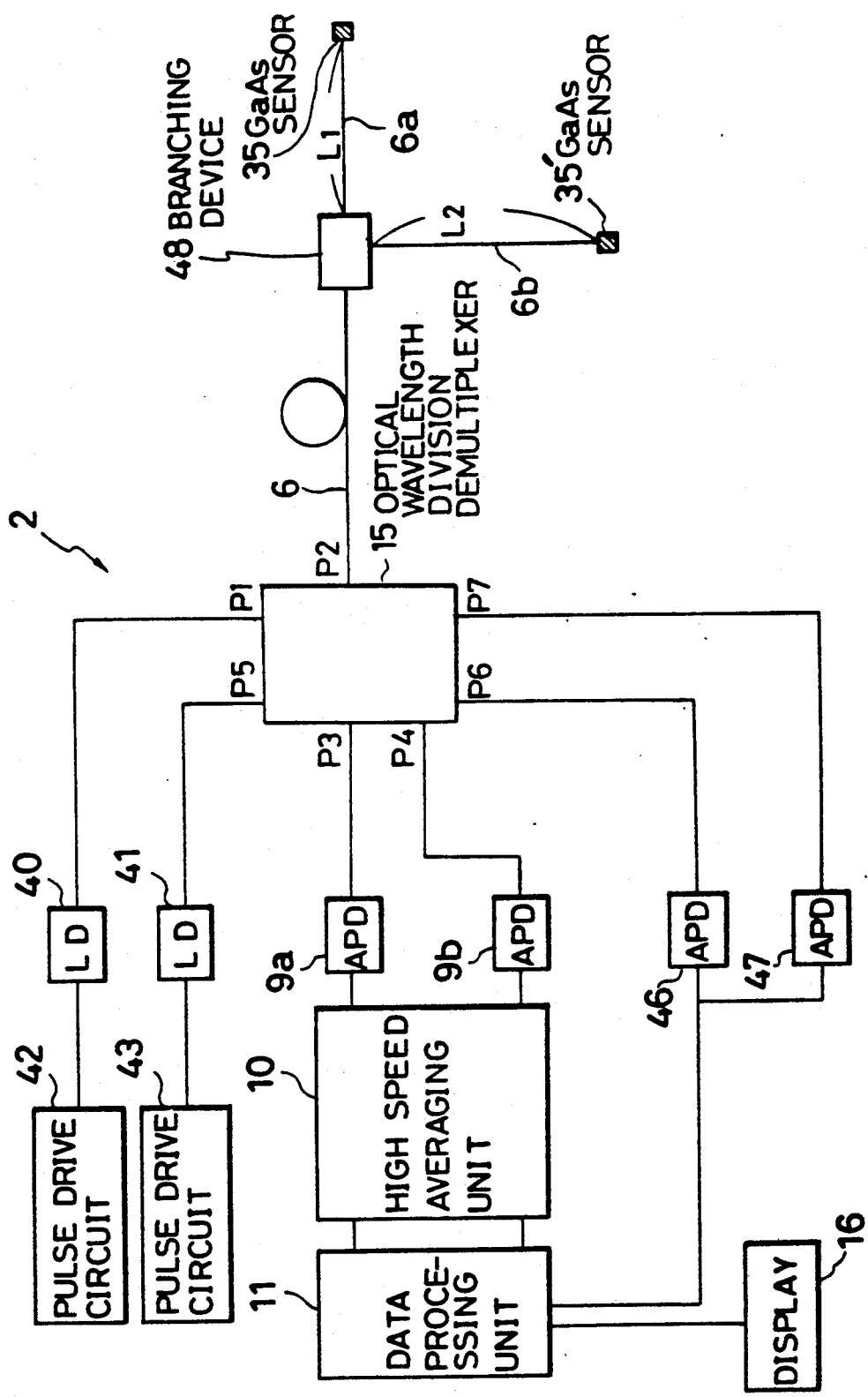
FIG. 31 illustrates another block diagram of the optical fiber type temperature sensor arrangement according to the present invention.

In the example of FIG. 29, only one optical fiber is employed. However, as shown in FIG. 31, an optical wave divider 48 may be provided at a proper position on the optical fiber 6 and the GaAs sensors 35 and 35' may be provided at the free ends of the optical fiber branches 6a and 6b extending from the optical wave divider 48 respectively.

Figure 32:
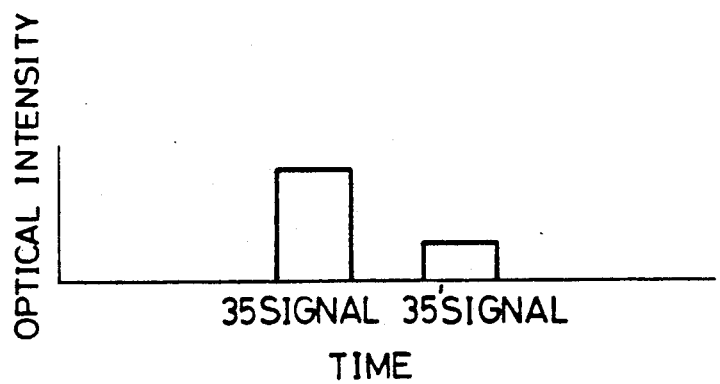
FIG. 32 depicts a signal corresponding to the free ends of the optical fiber with a branching device, where the GaAs sensors are attached.

FIG. 32 shows output wave forms at the optical fiber end which is obtained in a case where the branch 6a side dividing ratio of the optical wave divider 48 is larger than the branch 6b side dividing ratio of the same divider 48, with the length L1 of the branch 6a being smaller than the length L2 of the branch 6b. The signal from the GaAs sensor 35 of the branch 6a reaches the measuring system 2 before the signal from the GaAs sensor 35' of the branch 6b, so that two signals can be separated. The optical wavelength division demultiplexer 48 may be provided more than one signal.

In the example of FIG. 29, GaAs is employed, but a phosphorescent material may be used instead of GaAs and an ultraviolet light may be used as the light source such that fluorescence is detected.

Also, in the example of FIG. 29, the light source for a point temperature detection at the free end of the optical fiber branches 6a and 6b is the pulse light, but another kind of light may be used except the light having a wavelength range of Raman scattered light used for the temperature distribution measuring information. Also, similar results can be expected using a light source having a constant intensity.

(E) SENSITIVITY AND LIMIT OF APD

An outline of the Raman type temperature distribution sensor will be explained again with reference to FIG. 34.

As the pulse light from the light source 4 is guided to the sensor optical fiber 6, a part of the scattered light produced in the optical fiber 6 returns to the measuring system 2 as the backward scattered light and enters the optical wavelength division demultiplexer 15. In the wavelength division demultiplexer 15, the anti-Stokes light having a wavelength $\lambda a$ and the Stokes light having a wavelength $\lambda s$ are separated from each other among the the guided, backward scattered light. Then, the anti-Stokes light enters the anti-Stokes light measuring system 30a including an optical fiber 7a, a detector 9a, an amplifier 56a and an averaging circuit 10a. In the detector 9a, the guided anti-Stokes light is converted into an electrical signal and the amplifier 56a amplifies this signal to adjust the input level of the averaging circuit 10a to a proper value.

Figure 47:
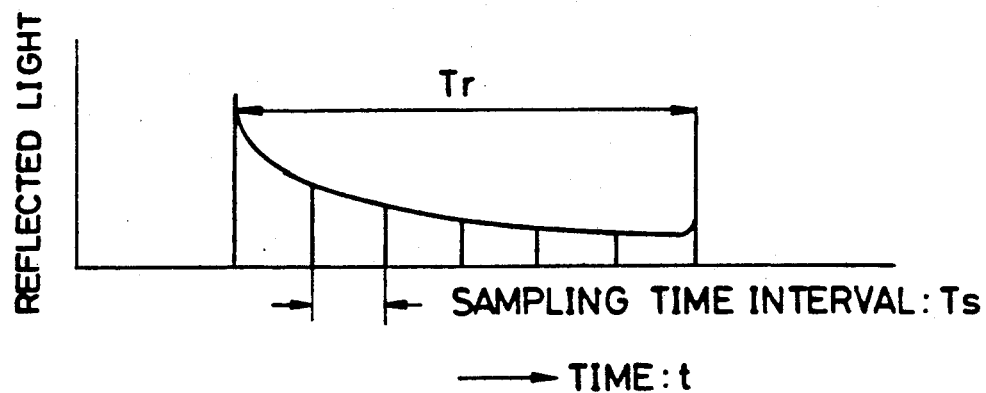
FIG. 47 is a graph of components of back scattered light related to pulses of an incident light beam carried along an optical fiber.

The synchronization between the pulse light sorce 4 and the averaging circuits 10a, 10b are conducted by a synchronizing signal of a trigger circuit 3, and the sampling of the reflected light is conducted in the averaging circuits 10a and 10b with constant time intervals Ts of FIG. 47. In the averaging circuit 10a, moreover, in order to improve the S/N ratio of the signal sampled with the time intervals Ts, a number of averaging processes are repeated in synchronization with the synchronizing signal of the trigger circuit 3.

The above-mentioned series of conversion, amplification and averaging processes can be expressed by a following equation (61). The averaging-processed value $\overline{Ia(t)}$ of time function of the anti-Stokes light intensity input into the detector is obtained from an equation (62) which is converted from the equation (61). Also, the averaging-processed value $\overline{Is(t)}$ of time function of the Stokes light can be obtained by a similar manner (an equation (63)).

$$\overline{Va(t)} = 1/N \sum_{n=1}^{N} Ia(t) \cdot \eta_a \cdot G_a \tag{61}$$

$$\overline{Ia(t)} = \overline{Va(t)}/(\eta_a \cdot G_a) \tag{62}$$

$$\overline{Va(t)} = \overline{Vs(t)}/(\eta_s \cdot G_s) \tag{63}$$

where
$\overline{V(t)}$ is an output of the averaging circuit;
$\overline{I(t)}$ is a averaging-processed value of intensity of the light input into the detector;
$\eta$ is a light/voltage conversion coefficiency of the detector; and
G is gain of the amplifier,
with suffixes a and s implying the anti-Stokes light and the Stokes light respectively.

Meantime, the optical fiber type temperature distribution sensor taking advantages of Raman scattered light or Rayleigh scattered light uses a very weak scattered light. Thus, the employed detectors 9a and 9b are very sensitive optic/electric (O/E) conversion devices. In most cases probably, an APD (avalanche photodiode) is employed. However, it should be noted that the detection sensitivity is more influenced as the detector becomes sensitive. Therefore, it is necessary to adjust the bias voltage of APD as the ambient temperature changes, in order to maintain the appropriate optical sensitivity.

Figure 34:
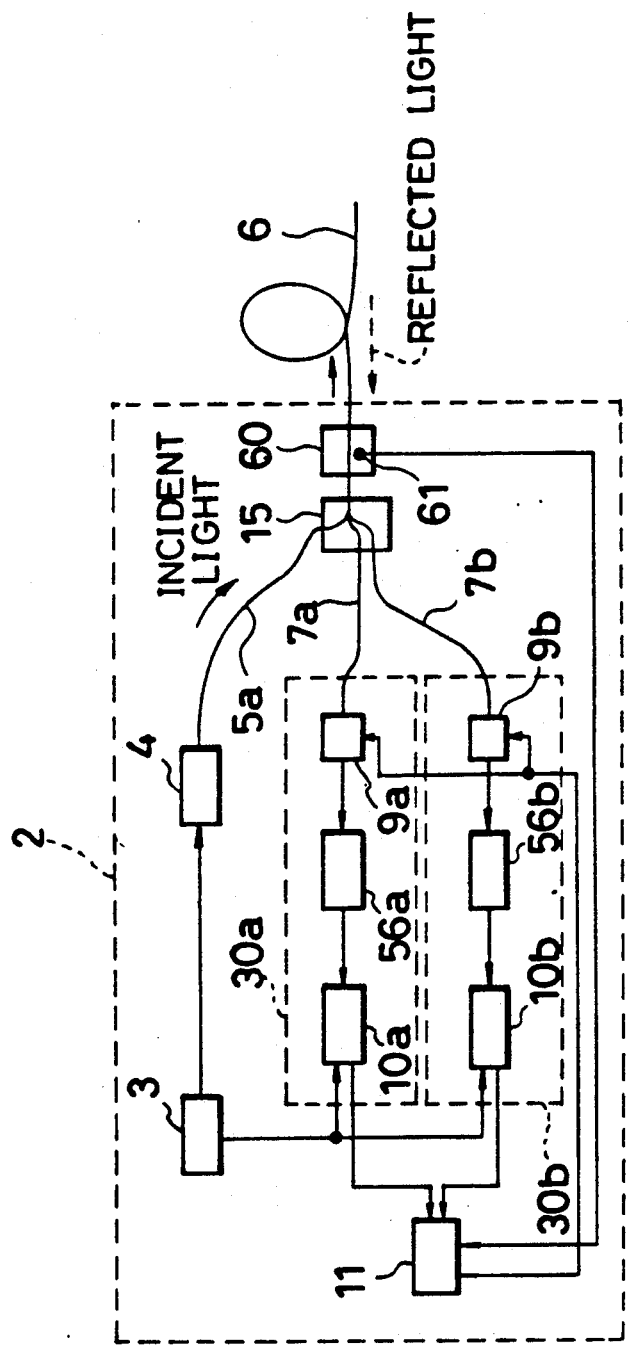
FIG. 34 depicts still another block diagram of the optical fiber type temperature distribution sensor arrangement according to the present invention.

Thereupon usually, as shown in FIG. 34, a control signal measuring unit 60 is provided to the sensor optical fiber 6 and the detection or light receiving sensitivity of APD is adjusted in a manner such that the averaging-processed value $\overline{Ia(t)}$ of the light intensity of the anti-Stokes light produced at the unit 60 and the averaging-processed value $\overline{Is(t)}$ of the light intensity of the Stokes light produced at the unit 60 become predetermined values respectively, whereby the measuring is carried out with stable sensitivity.

Figure 33A:
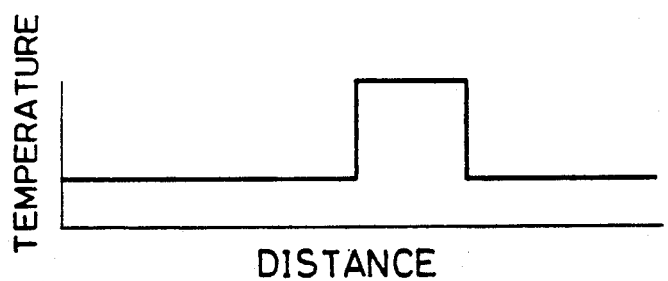
FIGS. 33a and 33b depict a relaxation phenomenon appearing in a measuring result of temperature distribution.
Figure 33B:
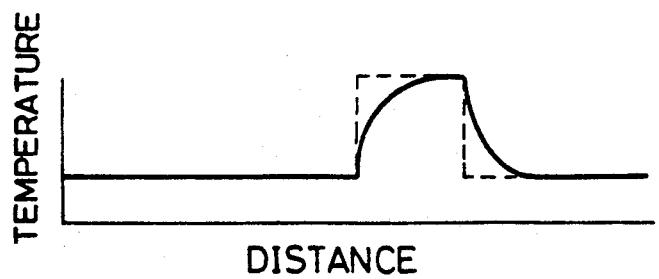

However, when goal values of the anti-Stokes light intensity and the Stokes light intensity are set to high values respectively in order to perform the measuring with a high S/N ratio, a high sensitivity measuring can be expected only within a certain ambient temperature range (for example, between 20° C. and 40° C.), i.e., a relaxation phenomenon appears in the waveform of the temperature distribution outside this range (for example, below 20° C.), as shown in FIG. 33. Specifically, with a part (control signal measuring portion 60) of the sensor being put in a constant temperature bath, even though a stepwise temperature change, as shown in FIG. 33(a), is applied to the optical fiber 6, the result of temperature distribution measurement is a distribution in which the stepwise temperature change is moderated in the distance direction (horizontal axis direction in the illustration) as indicated by the solid line of FIG. 33(b). This means that a relaxation phenomenon may appear even in a result of general temperature distribution measurement.

The following passages deal with an optical fiber type temperature distribution sensor which can output a temperature distribution stable against the ambient temperature change even when the goal values of the anti-Stokes light intensity and the Stokes light intensity are set to high values.

As mentioned above, when the goal values of the intensities of the anti-Stokes and the Stokes light used for the APD detection sensitivity control are set to high values, the result of the temperature distribution measurement has a relaxation phenomenon, as shown in FIG. 33, under a low temperature condition (below 20° C., ambient temperature). This will be discussed below in depth.

(1) First, the time function $\overline{Ia(t)}$ of the anti-Stokes light was examined among the anti-Stokes light and the Stokes light. The result shows that there is no relaxation phenomenon in the time function $\overline{Ia(t)}$ of the anti-Stokes light when the ambient temperature is high. However, when the ambient temperature becomes low, the relaxation tends to appear in the time function $\overline{Ia(t)}$. The inventors then found what caused this relaxation. It is that the actual APD detection sensitivity is slightly higher than the goal-to-be limit.

The above-mentioned limit of the detection sensitivity is determined by frequency characteristics of the APD. Specifically, the frequency characteristics of the APD vary with the detection sensitivity of the APD and the characteristics are maintained up to a high frequency range but deteriorated beyond this range. On the other hand, the detection sensitivity of the APD is controlled by the goal values of the anti-Stokes light and the Stokes light. Therefore, if the goal values of the anti-Stokes light intensity and the Stokes light intensity are set to unduly high in order to raise the S/N ratio of the temperature distribution measuring, the obtained temperature distribution has the relaxation. In order to avoid the relaxation phenomenon, it is important that the goal values of the anti-Stokes light intensity and the Stokes light intensity be set below the limit. Under this limit, the frequency characteristics of the APD are not deteriorated.

Meanwhile, the case where the relaxation phenomenon appears in the time function $\overline{Ia(t)}$ of the anti-Stokes light is a case where the goal values of the light intensity of both anti-Stokes light and the Stokes light are respectively set to the very limit. Therefore, the reason why the relaxation phenomenon appears in the time function $\overline{Ia(t)}$ of the anti-Stokes light is because the goal values of the anti-Stokes light intensity and the Stokes light intensity change, i.e., the light intensity to the control signal measuring system 40 changes due to some reasons, and the detection sensitivity of the APD exceeds the goaled limit.

(2) Thereupon, the above-mentioned point was focused. Then, the inventors found that even if the APD sensitivity is same, the anti-Stokes light intensity of the control signal measuring system 60 is small when the ambient temperature is low, as compared with a case when the ambient temperature is high. For example, when the ambient temperature was 0° C., the light intensity was smaller by 20% in comparison to a case of 40° C. With this phenomenon, if the APD sensitivity control is performed in a manner such that the output of the equalizing circuit 11 corresponding to the anti-Stokes light intensity is the goal value under a condition of low ambient temperature, the actual APD sensitivity becomes larger than the limit. As a result, the frequency characteristics of the APD are deteriorated and the relaxation phenomenon occurs in the result of the temperature distribution measurement and the time function $Ia(t)$ of the anti-Stokes light.

(3) A similar phenomenon, only slightly though, can be seen in the Stokes light.

(4) From (3), it can be concluded that the reason why the anti-Stokes light intensity and the Stokes light intensity of the control signal measuring system 40 vary with the ambient temperature even when the APD detection sensitivity is constant is because the anti-Stokes light intensity and the Stokes light intensity at this portion vary with the temperature as expressed by following equations (64) and (65) but the control was performed without a consideration of these changes.

$$Ia \alpha \beta(t)/\{1-\beta(t)\} \quad (64)$$

$$Is \alpha 1/\{1-\beta(t)\} \quad (65)$$

where $\beta(t) = \exp\{-(h \cdot v \cdot v_k)/(k \cdot T)\}$ and
where
Ia is the anti-Stokes light intensity;
Is is the Stokes light intensity;
h is Planck's constant;
v is a light velocity in the optical fiber;
$v_k$ is Raman shift wave number;
k is Boltzmann's constant; and
T is temperature.

To avoid such things, it is necessary to detect the actual temperature Tc of the control signal measuring system 60, to modify the anti-Stokes light intensity and the Stokes light intensity respectively measured at the control signal measuring system 60 and to perform the APD detection sensitivity control using the modified result.

One example thereof will be described with reference to FIG. 34.

In FIG. 34, numeral 61 denotes a point type temperature sensor for measuring the temperature Tc of the control signal measuring system 60. The point type temperature sensor 61 may include a temperature detecting element such as a Thermo couple a platinum resistance or a thermistor.

The APD detection sensitivity control of the detectors 9a and 9b is performed in the following manner.

The temperature distribution computing circuit 11 does not directly use the measured values $\overline{Iaco}$ and $\overline{Isco}$ of the anti-Stokes light intensity and the Stokes light intensity in the control signal measuring system 60, but first the measured values $\overline{Iaco}$ and $\overline{Isco}$ of the anti-Stokes light intensity and the Stokes light intensity are converted by the following equations (67) and (68) using the temperature Tc of the control signal measuring system 60 input from the point type temperature sensor 61.

$$\overline{Iac} = \frac{\beta(Ts)/\{1 - \beta(Ts)\}}{\beta(Tc)/\{1 - \beta(Tc)\}} \overline{Iaco} \quad (67)$$

$$\overline{Isc} = \frac{1/\{1 - \beta(Ts)\}}{1/\{1 - \beta(Tc)\}} \overline{Isco} \quad (68)$$

where

Tc is a measured temperature of the point type temperature sensor (temperature of the control signal measuring system); and Ts is a reference temperature.

Next, control signals are given to a bias adjusting circuit of the APD in a manner such that the converted values ($\overline{Iac}$, $\overline{Isc}$) become the predetermined goal values Iat and Ist.

The goal values Iat and Ist of the anti-Stokes light intensity and the Stokes light intensity of the control signal measuring system 60 are determined in a manner such that when the temperature Tc of the control signal measuring system 60 is equal to the reference temperature Ts, the frequency characteristics of the APD are not deteriorated even at the high frequency range and the relaxation phenomenon does not appear in the measured temperature distribution.

A concrete control technique for the APD detection sensitivity using the converted values Iac and Isc drawn from the equations (67) and (68) may be a known control technique. Here, the following simple technique is used: the converted values Iac and Isc are compared with the goal values Iat and Ist respectively. If the converted values Iac and Isc are smaller than the corresponding goal values, the corresponding detection sensivities of the APD are raised while if the former are larger than the latter, the corresponding detection sensitivities of the APD are lowered. However, another technique, for instance, PID control may be employed.

Performing such a control means maintaining the light/voltage conversion coefficient $\eta$ of the detectors 9a and 9b of the equations (61) to (63) constant. This also means that an arbitrary APD temperature is measured with a constant light/voltage coefficient. Therefore, it is possible to maintain the APD detection sensitivity constant, and as a result, the detection sensitivity does not exceed the limit even if the APD temperature changes. In other words, the relaxation phenomenon which occurs with the deterioration of the APD frequency according to the conventional manner will not occur.

In the example of FIG. 34, the equalizing-processed value $\overline{Ia(t)}$ of the intensity of the anti-Stokes light input to the detector 9a and the averaging-processed value $\overline{Is(t)}$ of the intensity of the Stokes light input to the detector 9b are used as the signals of the anti-Stokes light and the Stokes light of the control signal measuring system 60 are used for the APD detection sensitivity control respectively. However, instead of these averaging-processed signals, the outputs $\overline{Va(t)}$ and $\overline{Vs(t)}$ of the averaging process circuits 10a and 10b may be used. Also used in FIG. 34 are the averaging-processed values of the anti-Stokes light and the Stokes light respectively input to the detectors, i.e., $\overline{Ia(t)}$ and $\overline{Is(t)}$, but the intensities of the anti-Stokes light and Stokes light strength actually produced in the control signal measuring system 60, which are obtained from $\overline{Ia(t)}$ and $\overline{Is(t)}$, may be used instead. In short, any parameters proportional to the light intensities of the anti-Stokes light and the Stokes light produced in the control signal measuring system 60 are satisfactory.

In addition, any number of sampling points with the sampling timing interval Ts may be included in the control signal measuring system 60. In a case where a plurality of sampling points are included, it is possible to perform a high accuracy APD detection control by using an average of them, as compared with a case using one sampling point.

(F) ELIMINATION OF TRANSMISSION LOSS DIFFERENCE

A concrete technique of obtaining the temperature of the sensor optical fiber from the light intensities of two components of measured Raman scattered light (the anti-Stokes light and the stokes light) will be explained.

The measured scattered light intensities are detected for every sampling interval, and the n-thly measured anti-Stokes light intensity Ia(n) (n=1, 2, 3, - - - ), the attenuation coefficient thereof $\gamma a(n)$, the n-thly measured Stokes light intensity Is(n) and the attenuation coefficient thereof $\gamma s(n)$ are given by following equations.

$$Is(n) = Ks \cdot \gamma s(n) \cdot Bs\{T(n)\} \quad (71)$$
$$Ia(n) = Ka \cdot \gamma a(n) \cdot Ba\{T(n)\}$$
where
$$Bs(T) = 1/\{1 - \beta(T)\}$$
$$Ba(T) = \beta(T)/\{1 - \beta(T)\}$$
$$\beta(T) = \exp\{-(h \cdot v_k \cdot c)/(n_c \cdot k \cdot T)\}$$
$$\gamma s(n) = \exp\{-(\alpha r + \alpha s) \cdot n \cdot \Delta x)\}$$
$$\gamma a(n) = \exp\{-(\alpha r + \alpha a) \cdot n \cdot \Delta x)\} \quad (72)$$

Ks, ka: constant,
$\gamma s$, $\gamma a$: attenuation coefficient,
Bs(T), Ba(T): Raman scattered light generation probability,
$\beta(T)$: temperature function determining Raman scattered ligth generation probability,
h: Planck's constant,
$v_k$: shift wave nummber determined by structure material of optical fiber core,
c: light velocity,
$n_c$: refractive index of optical fiber core,
k: Boltzmann's constant,
T: absolute temperature,
$\alpha r$: transmission loss of Rayleigh scattered light,
$\alpha s$: transmission loss of Stokes light, αa: transmission loss of anti-Stokes light,
Δx: distance corresponding to sampling interval.

With the equation (71), a ratio of the light intensities of the anti-Stokes light and the Stokes light will be given by a following equation.

$$\frac{Ia(n)}{Is(n)} = \frac{Ka}{Ks} \cdot \frac{\gamma a(n)}{\gamma s(n)} \cdot \beta\{T(n)\} \tag{73}$$

When the atenuation coefficients γs and γa are already known, the temperature function β(T) determining the Raman scattered light generation probability is obtained from the measured Ia(n), Is(n) and the equation (73). Then, the temperature T(n) corresponding to the n-th sampling point is obtained using the equation (72).

The distance x(n) corresponding to the n-th sampling point is proportional to the time t(n) spent for a reciprocating propagation of the distance x(n). Therefore, the relation between these two is expressed by a following equation (74).

$$x(n) = \{c \cdot t(n)\}/(2 \cdot nc) \tag{74}$$

In this manner, the distance and the temperature corresponding to each sampling point are obtained, whereby the temperature distribution along the optical fiber can be measured. Since the temperature is obtained from the ratio of the anti-Stokes light and the Stokes light (two components of Raman scattered light), as shown by the equation (73), the temperature is not affected by the microbending loss and the coupling or connection loss of the optical fiber which are contained same amounts in both components.

By use of the equation (73), the ratio of the attenuation coefficients {γa(n) /γs(n)} required in calculation of the temperature function β{T(n)} is expressed by Δα (the difference between the transmission losses αa and αs), as shown by the equation (75). Therefore, the temperature function β{T(n)} is obtained when Δα is known.

$$\{\gamma a(n)/\gamma s(n)\} = \exp(-\Delta\alpha \cdot n \cdot \Delta x) \tag{75}$$

where $$\Delta\alpha = \alpha a - \alpha s$$

Since the transmission loss difference Δα is very small, this loss difference can be neglected when the optical fiber is short but cannot be neglected when the optical fiber is long.

Conventionally, the transmission loss is measured before disposing of the optical fiber, and it is determined whether a certain measure has to be taken or temperatures at several points on the optical fiber are measured by a seperate thermometer. In other words, the optical fiber is adjusted to have an uniform temperature along the entire length thereof and the anti-Stokes light and the Stokes light are measured at every sampling time to obtain the transmission loss difference Δα at an arbitrary interval. For example, the transmission loss Δα between the sampling points n1 and n2 is obtained from the equations (71) and (72) in consideration of the temperature function β(T) being constant lengthwise entirely and the result is given by the equation (76).

$$\Delta\alpha = [1/\{(n2-n1)\cdot\Delta x\}] \cdot \ln[\{Ia(n1)/Ia(n2)\} \div \{Is(n1)/Is(n2)\}] \tag{76}$$

However, according to the above-described approach, when the already installed optical fiber whose accurate transmission loss is not known or a cheap optical fiber whose transmission loss would change in a long period of time are use as a sensor, a difficulty can be found in the measuring accuracy. On the other hand, employing the separate thermometer raises a problem of cost.

Figure 36A:
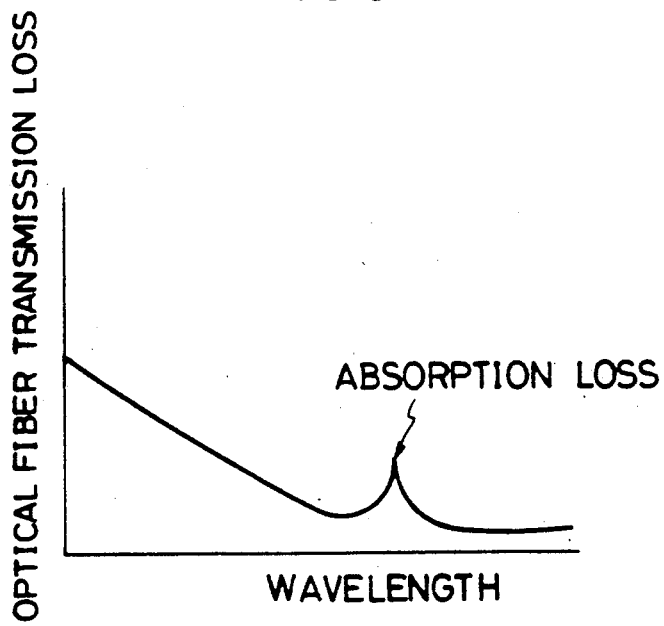
FIGS. 36a and 36b are a set of views useful to explain a transmission loss of the optical fiber, FIG. 36(a) specifically showing a case where an absorption loss appears in a particular wavelength range and FIG. 36(b) showing a measuring result of the transmission loss difference of the optical fiber according to the present invention.

Also, the transmission loss of the optical fiber, as shown in FIG. 36(a), may have a curve including an absorption loss at a particular wavelength range. If the optical fiber is used in this wavelength range for a long time, the transmission loss might change. Therefore, a conventional Raman type temperature sensor is used outside this range. In other words, the conventional temperature sensor has a limit on the wavelength range to be used. This means that an arbitrary light source cannot be employed, which makes the entire system expensive.

The following passages deal with a technique to measure the transmission loss difference Δα of two components (the anti-Stokes light and the Stokes light) of Raman scattered light.

Figure 35:
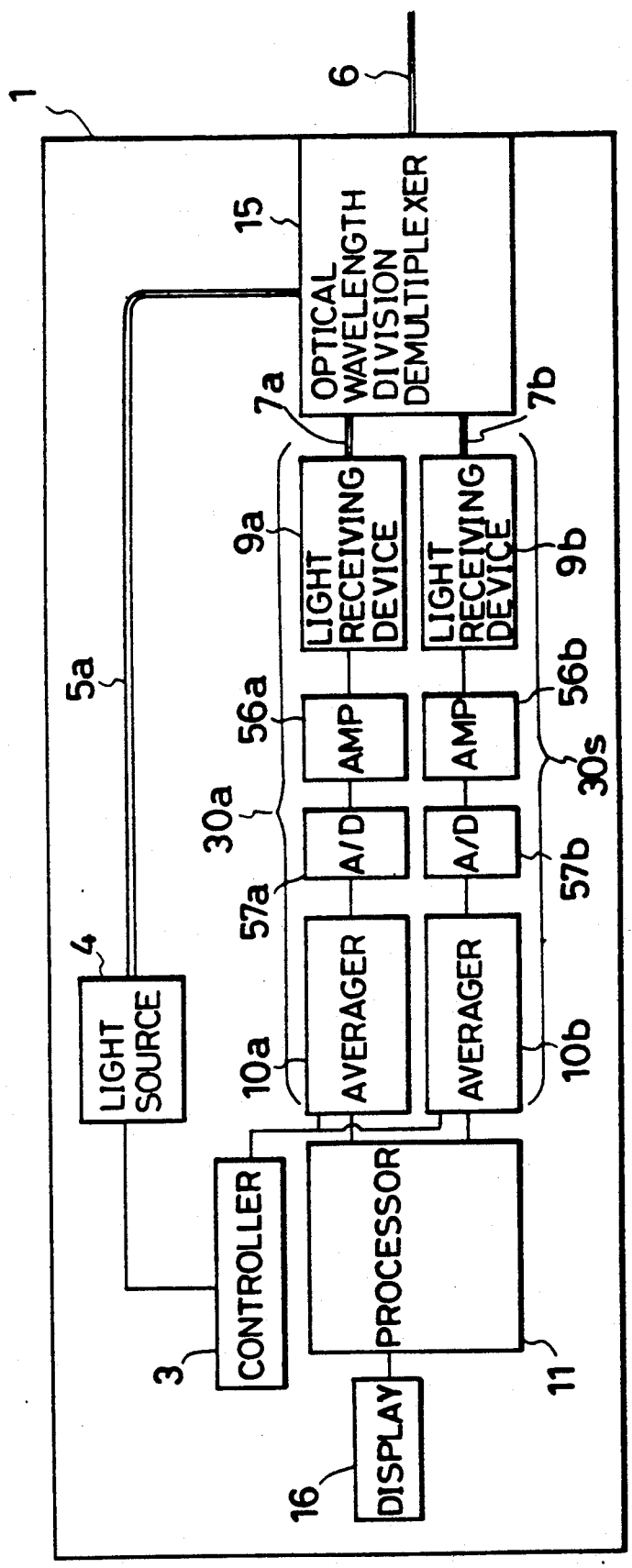
FIG. 35 depicts a yet another embodiment of the present invention.

Referring to FIG. 35, the pulse light source 4 emits the light at a wavelength λo in synchronization with a synchronizing signal from the trigger circuit (controller) 3. The pulse light of the light source 4 is introduced into the sensor optical fiber 6 via an optical fiber 5a and the optical wavelength division demultiplexer 15. Part of scattered light produced in the optical fiber 6 returns to the measuring system 2 as backward scattered light and enters the wave divider 15. In the wavelength division demultiplexer 15, the anti-Stokes light of wavelength λa and the Stokes light of wavelength λs are separated from each among the introduced backward scattered light.

The divided anti-Stokes light of wavelength λa passes through an optical fiber 7a and enters an anti-Stokes light measuring system 30a including a detector 9a, an amplifier 56a, an A/D converter 57a and an equalizing process circuit 8a. A signal of the anti-Stokes light converted into an electrical signal by the detector 9a is amplified by the amplifier 56a, then sampled by the A/D convertor 57a with a sampling time 10 ns corresponding to a sampling distance 1 m and converted into a digital signal $i_{a(n)}$. The data $i_{a(n)}$ corresponding to anti-Stokes light intensities from respective sampling points (positions) on the optical fiber undergo an arithmetic averaging process of, for example, $2^{16}$ times by the averaging process circuit 8a, whereby a sampling data Ia(n) with a high S/N is obtained.

On the other hand, the Stokes light of wavelength λs divided by the wave divider 15 enters the Stokes light measuring system 30b and undergoes a similar process which the anti-Stokes light experiences, and then a sampling data Is(n) is output from the equalizing process circuit 10b.

In the temperature distribution computing circuit 11, the equalizing-processed sampling data Ia(n) and Is(n) are input to a following equation (78) for each sampling point to obtain relations for respective sampling points.

$$Is(n)/\{Ks \cdot \gamma s(n)\} - Ia(n)/\{Ka \cdot \gamma a(n)\} = 1 \tag{78}$$

It is apparent from the equation (72) that the attenuation coefficients $\gamma a(n)$ and $\gamma s(n)$ of the equation (78) can be expressed by the transmission losses $\alpha r$, $\alpha a$ and $\alpha s$ only. Here, the equation (78) is obtained as follows: the equation (77) which is obtained by developing the equation (72) is applied to the equation (71) and temperature dependent terms are eliminated.

$$Bs(T)-Ba(T)=1 \tag{77}$$

Next, the temperature distribution computing circuit 11 chooses arbitrarily three equations among the above obtained equations for each sampling point to obtain the transmission losses $\alpha r$, $\alpha a$ and $\alpha s$ as three unknowns by solving the simultaneous equations.

The temperature distribution computing circuit 11 also calculates the attenuation coefficients $\gamma a(n)$ and $\gamma s(n)$ corresponding to the respective sampling points, using the obtained transmission losses $\alpha r$, $\alpha a$ and $\alpha s$. Here, the constants Ka and Ks are obtained beforehand by measuring Ia(n) and Is(n), using an optical fiber whose attenuation coefficient is already known, by use of the equation (78).

The attenuation coefficients $\gamma a(n)$ and $\gamma s(n)$ are input to the equation (73) to obtain the temperature T(n) at the respective sampling points.

According to this manner, even if the transmission loss of the optical fiber is unknown, it is possible to obtain the temperature distribution T(n) along the optical fiber by the optical fiber (sensor) itself.

In the foregoing, example a combination of three arbitrary equations are used in obtaining the three unknown transmission losses $\alpha r$, $\alpha s$ and $\alpha a$. However, since there are a number of equations available, namely as many as the number of samplings, another combination of three equations may be used together. For example, the average of the transmission losses $\alpha r$, $\alpha s$ and $\alpha a$ respectively obtained from two groups of three equations may be used. In such a case, a higher accuracy can be expected in the temperature distribution as compared with a case using the transmission losses $\alpha r$, $\alpha s$ and $\alpha a$ obtained from only one group of three equations.

Also, the attenuation coefficients may be calcualted by a repeating process as will be described below.

For the convenience of explanation, a drawing technique of the equation (712) which is used instead of the equation (78) will be described first.

The transmission losses $\alpha r$, $\alpha s$ and $\alpha a$ can be expressed by a set of equations (79).

$$\alpha r = \alpha r0 + \Delta \alpha r$$
$$\alpha s = \alpha s0 + \Delta \alpha s \tag{79}$$
$$\alpha a = \alpha a0 + \Delta \alpha a$$

Here, the first terms on the right side of the equations (79) are assumed values and the second terms are difference between the assumed values and the true values respectively.

The attenuation coefficients can be approximated by the equations (710) by inputting, the equation (79) to the equation (72).

$$\gamma s(n) = ks^n \cdot (1 - n \cdot \epsilon s) \tag{710}$$
$$\gamma a(n) = ka^n \cdot (1 - n \cdot \epsilon a)$$

where $$ks = \exp\{-(\alpha r0 + \alpha s0) \cdot \Delta x\} \tag{711}$$
$$ka = \exp\{-(\alpha r0 + \alpha a0) \cdot \Delta x\}$$
$$\epsilon s = (\Delta \alpha r0 + \Delta \alpha s0) \cdot \Delta x$$
$$\epsilon a = (\Delta \alpha r0 + \Delta \alpha a0) \cdot \Delta x$$

Imputting the equation (710) to the equation (78) results in the equation (712).

$$Ys(n)\cdot(1+n\cdot\epsilon s) - Ya(n)\cdot(1+n\cdot\epsilon a) = 1 \tag{712}$$

where $$Ys(n) = Is(n)/\{Ks \cdot ks^n\} \tag{713}$$
$$Ya(n) = Ia(n)/\{Ka \cdot ka^n\}$$

The equation (712) is effective at each sampling point and the unknowns are $\epsilon s$ and $\epsilon a$ only. Values other than the unknowns are obtained from the measuring result.

First, a calculation of least square is applied to the equations effective at the measuring points for Is(n) and Is(n) to obtain $\epsilon s$ and $\epsilon a$. Ks and Ka are previously obtained and ks and ka are determined from the assumed values $\alpha r$, $\alpha s$ and $\alpha a$.

Next, the attenuation coefficients $\gamma a$ nd $\gamma s$ as well as the transmission losses $\gamma r$, $\gamma s$ and $\gamma a$ are obtained from the equations (79) to (711), using $\epsilon s$ and $\epsilon a$.

The above-described calculations are repeated supposing that the thusly obtained transmission losses $\alpha r$, $\alpha a$ and $\alpha s$ are the first terms on the right side of the equation (79), i.e., that $\alpha ro = \alpha r$, $\alpha so = \alpha s$ and $\alpha ao = \alpha a$. This second calculation reduces the magnitude of the difference $\Delta \alpha r$, $\Delta \alpha s$ and $\Delta \alpha a$ between the assumed values and the true values as compared with the differences after the first calculation and improves the accuracy of the $\alpha r$, $\alpha s$ and $\alpha a$ as compared with the same.

If the calcuations are repeated for a number of times, for example 100 times, finally obtained transmission losses $\alpha r$, $\alpha s$ and $\alpha a$ have very high accuracy respectively. The attenuation coefficients $\gamma a(n)$ and $\gamma s(n)$ corresponding to the respective sampling points are obtained using these highly accurate values and the result is input to the equation (73) to obtain the temperature distribution T(n).

Figure 36B:
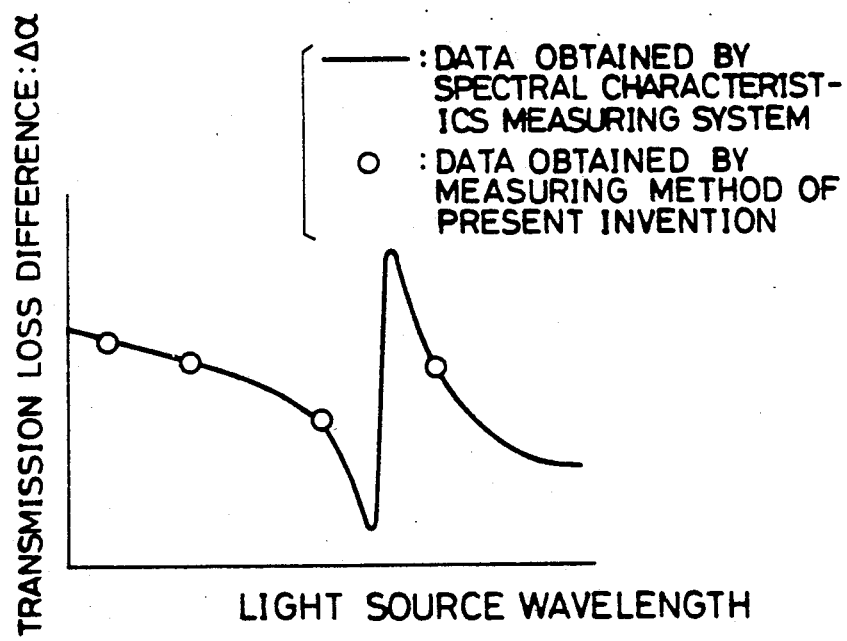

FIG. 36(b) shows the result (white circles) of actual measurement of the transmission loss difference $\Delta \alpha$ of the sensor optical fiber after the repeated calculations. This result coincides with the result (solid line) obtained using a spectral characteristics measuring device. This means that the repetitive calculations are meaningful.

The foregoing deals with the optical fiber type temperature distribution sensor using Raman scattered light as the temperature information though, it may be applied to the optical fiber type temperature distribution sensor using a combination of Rayleigh scattered light and Raman scattered light and in this case the same effects can be expected.

Even in the wavelength range in which the absorption loss occurs, the temperature distribution measurement is made possible. Therefore, a light source having arbitrary wavelength can be used. This reduces the manufacturing cost of the entire sensor arrangement. Also, even if the transmission loss of the sensor optical fiber changes due to a certain reason, the loss is assessed accurately so that an inexpensive optical fiber can be used and the reliability of the temperature distribution sensor arrangement is improved. In addition, even if the temperature distribution of the sensor optical fiber is unkown, it is not necessary to know the transmision loss beforehand the transmission loss will become a known value.

(G) ELIMINATION OF INFLUENCE OF OPTICAL LOSS

As described above, since the wavelengths of the stokes light and the anti-Stokes light are different from each other, the transmission losses in the sensor optical fiber are also different. Therefore, when the intensity ratio of the Stokes light and the anti-Stokes light is taken as the temperature information, a compensation with respect to the transmission loss difference between the Stokes light and the anti-Stokes light is necessary, and accordingly their constants have to be assessed correctly.

However, the above-mentioned approaches (FIGS. 35 and 36) detect the lights having different wavelengths (the Stokes light and the anti-Stokes light), so that the detection part becomes complicated and makes the entire system expensive.

Figure 37:
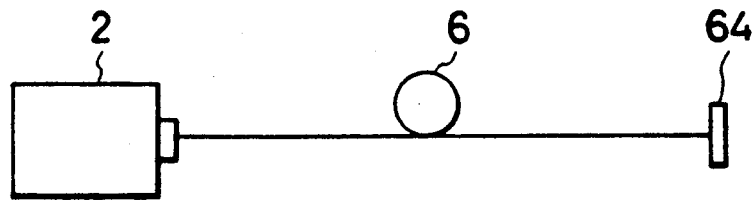
FIG. 37 depicts a schematic block diagram of the optical fiber type temperature distribution sensor arrangement according to the present invention.

FIG. 37 illustrates a perspective view of another fiber type temperature distribution sensor arrangement which uses only one component of Raman scattered light. As illustrated, a reflection plate 64 is provided at a free end of the sensor optical fiber 6 for totally reflecting a light input. The measuring system 2 detects temperature of a part of the optical fiber using the OTDR method. The measuring system 2 includes the already mentioned light source 4, the optical wave divider 15, the detectors 9a and 9b, the equalizing process circuits 10a and 10b and the temperature distribution computing circuit 11. Here, it should be noted that since one component of Raman scattered light is enough, either one of the anti-Stokes light measuring unit 30a or the Stokes light measuring unit 30b is enough as the OTDR measuring circuit.

A following example deals with a case where the anti-Stokes light is used.

When the light pulse output from the light source of the measuring system 2 passes through the sensor optical fiber 6, reaches the reflection plate 64 and returns to the measuring system 2, the backward scattered light is generated at every point of the sensor optical fiber 6 and guided into the measuring system 2, so that the anti-Stokes light is divided by the optical wave divider 15 and then detected by the detector 9a of the anti-Stokes light measuring unit 30a inside the measuring system 2.

Figure 38:
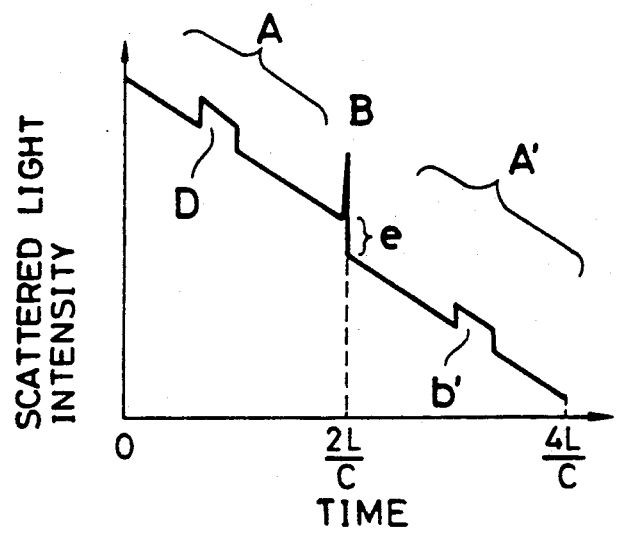
FIG. 38 depicts a measuring result of time change of the backward scattered light intensity, measured by the sensor arrangement of FIG. 37.

FIG. 38 shows one example of the change of the scattered light intensity with time. The scattered light intensity has an illustrated inclination due to the transmission loss of the optical fiber 6.

When "L" is assigned to the total length of the sensor optical fiber 6 and "C" is assigned to the light velocity in the optical fiber, time for the light output from the light source 4 returning as the backward scattered light at a position just before the reflection plate 64, i.e., the time between the opitcal pulse being output and the backward scattered light reaching the detector inside the measuring system 2, is equal to 2L/C. On the other hand, the output optical pulse is reflected by the reflection plate 64, and among the scattered light generated at the position just before entering the measuring system 2, a part advancing in the direction of the reflection plate 64 is reflected by the reflection plate 64. Time for reaching the system 2 is 4L/C.

Therefore, the backward scattered light intensity changes with time as depicted in FIG. 38. Specifically, the backward scattered light intensitiy changes as indicated by A of FIG. 38 until the optical pulse output from the light source 4 reaches the reflection plate 64, and shows Fresnel reflection at the end of the optical fiber as indicated by B. The intensity change of the backward scattered light by the optical pulse returning to the system 2 as reflected by the reflection plate 64 includes a loss due to reflection by the reflection plate 64 as indicated by e and draws a curve thereafter as indicated by A'. The scattered light intensity during a time $\Delta t$ with the time 2L/C being the center corresponds to the scattered light intensity at the same position (distance) on the sensor optical fiber. D and D' denote backward scattered light intensities at a high temperature portion respectively.

The backward scattered light indicated by A' becomes a measurable level at the input end by providing the reflection plate 64. If the reflection plate 64 is not provided, as in the conventional arrangement, the amount of light reflected at the far end of the optical fiber is small and the loss at e is large so that the backward scattered light indicated by A' cannot be detected.

Figure 39:
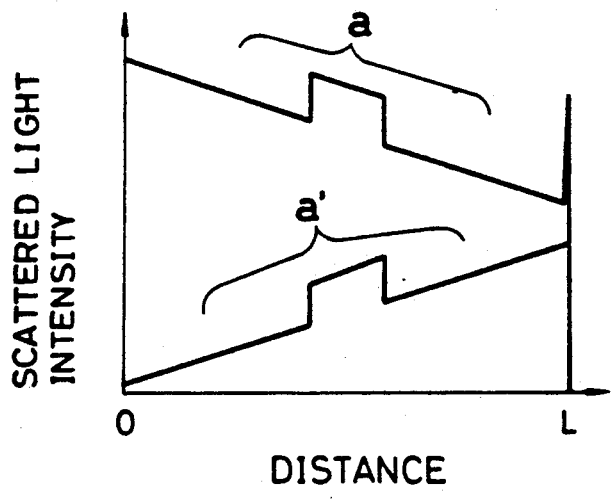
FIG. 39 depicts a measuring result of the backward scattered light intensity along the optical fiber, measured by the sensor arrangement of FIG. 37.

FIG. 39 shows a diagram when the time change of the logarithmic scale for the scattered light intensity is made to correspond to the distance of the optical fiber 6. Specifically, the scattered light intensity generated until the light pulse output from the light source 4 reaches the reflection plate 64 is shown by a of FIG. 39 and the scattered light intensity after the light pulse is reflected by the reflection plate 64 is shown by a'.

Figure 40:
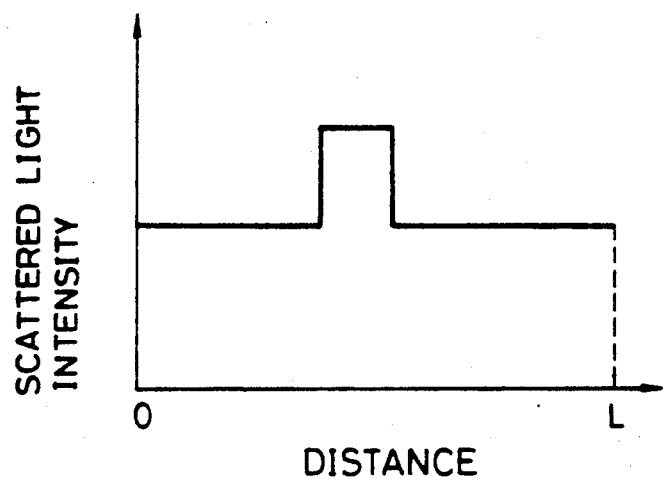
FIG. 40 depicts a measuring result of relation between the backward scattered light intensity which only depends on temperature and the distance on the optical fiber.

It is possible to eliminate the scattered light change due to the transmission loss of the optical fiber 6 by computing (a+a') at respective positions on the optical fiber 6 by the temperature distribution computing circuit 11 installed in the system 2. The result is shown in FIG. 40, in which the scattered light intensity change with the temperature only. Therefore, the temperature information is obtained.

Figure 41:
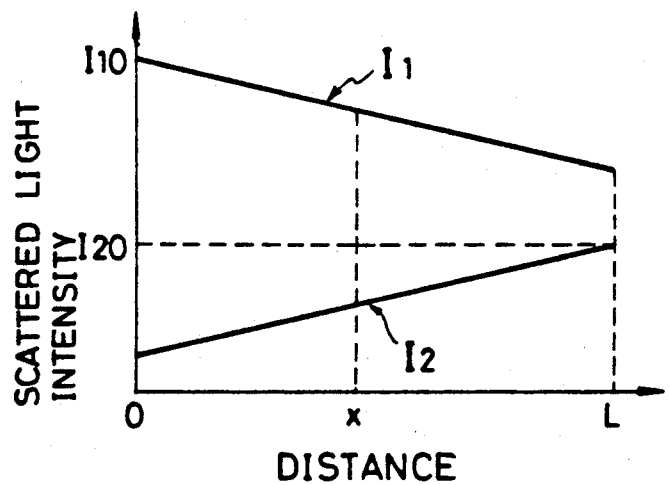
FIG. 41 depicts a measuring result of the backward scattered light intensity along the optical fiber when loss by Rayleigh scattering is removed.

This approach will be explained in depth with FIG. 41.

When "L" is assigned to the sensor optical fiber total length, "$I_1$" to the backward scattered light intensity change due to the transmitted light pulse until reaching the reflection plate from the input end of the sensor optical fiber, "$I_2$" to the backward scattered light intensity change due to the transmitted light pulse after reflection by the reflection plate 64, "$I_{10}$" to the value of $I_1$ at the optical fiber input end and "$I_{20}$" to the value of $I_2$ at the position of the reflection plate 64, $I_1(x)$ and $I_2(x)$ ($I_1$ and $I_2$ at the distance x from the optical fiber input end) are given by following equations respectively.

$$I_1(x) = I_{10}\exp(-\alpha \cdot x)f(Tx)$$

$$I_2(x) = I_{20}\exp\{-\alpha(L-x)\}f(Tx)$$

where
$\alpha$ is a constant and
f(Tx) is a temperature function.

The geometrical average $I^*(x)$ of $I_1(x)$ and $I_2(x)$ is expressed as follows:

$$\begin{aligned}I^*(x) &= \{I_1(x)I_2(x)\}^{0.5}\\ &= (I_{10}I_{20})^{0.5}f(Tx)\end{aligned}$$

Thusly obtained I*(x) does not have a term of transmission loss and becomes a function of the temperature information f(Tx) only.

Therefore, with this information, it is not necessary to consider the transmission loss of the optical fiber and it is possible to use an arbitrary optical fiber as the sensor. Also, since it is possible to detect the temperature using only one component of Raman scattered light, the entire system can be made inexpensive.

A mirror may be a typical element used as the reflection plate 64, but another element is also satisfactory as long as it can reflect light totally.

(H) DETECTION OF RANGE SMALLER THAN DISTANCE RESOLVING POWER

A conventional optical fiber type temperature sensor has the following drawbacks:

(1) It is impossible to detect a temperature of an object which is smaller than the minimum detectable distance of the system. The detectable distance would be shortened by reducing a pulse width of a light source and raising a sampling frequency. However, this requires a high speed pulse generator and a high speed data processing unit. This raises cost;

(2) When a part of the optical fiber installed is coiled to form an optical fiber type spot sensor, the optical loss increases due to a twist of the optical fiber and accordingly the dynamic range of the temperature distribution sensor is restricted, whereby it is required to reduce the number of the spot sensors and the distance of the optical fiber. Also, deformation due to the twist lowers the strength of the fiber and a long term reliability is deteriorated; and (3) The optical fiber may be cut and the optical fiber type spot sensor (point sensor), which is coiled beforehand in a manner such that the sensor does not have twist, may be inserted and coupled to the cut portion of the optical fiber by fusion splicing. However, the fusion splicing is a troublesome work. In addition, once the sensor is coupled to the optical fiber, it is difficult to remove the sensor because of the fusion splicing.

The following passages deal with the optical fiber type spot sensor which does not have any twists.

Figure 42:
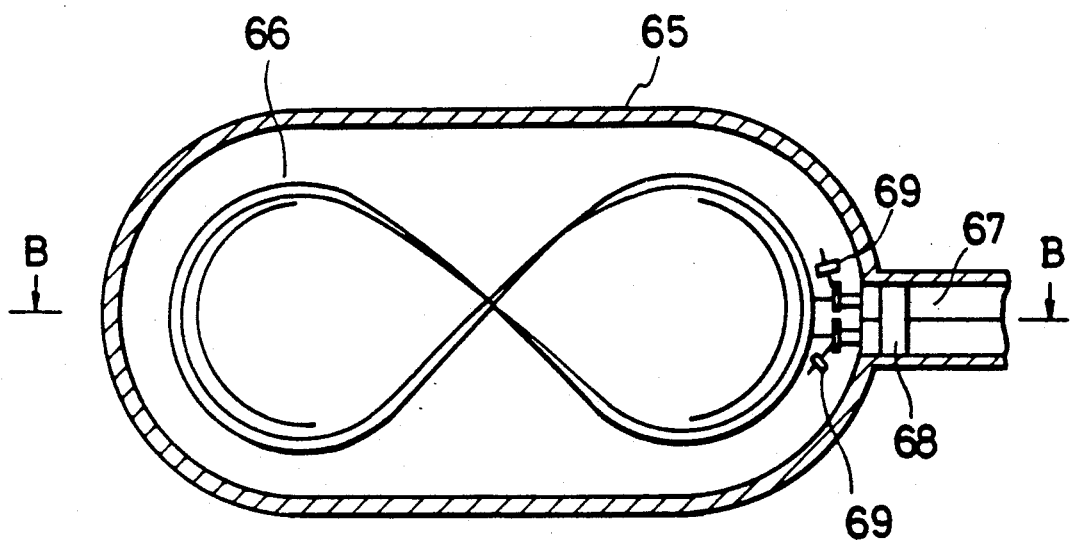
FIG. 42 is a sectional view showing a schematic overall view of the optical fiber type spot sensor according to the present invention.
Figure 43:
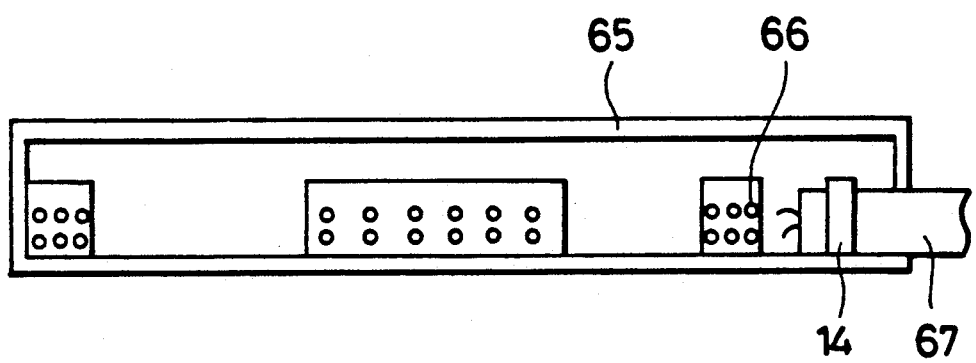
FIG. 43 is a sectional view taken along the line B—B of FIG. 42.

Referring to FIGS. 42 and 43, numeral 65 denotes an oval casing made from a material including good heat transfer properties. The casing 65 forms, with an optical fiber core wire 66 disposed in the casing 65, an optical fiber type spot sensor.

The already installed sensor optical fiber 6 is drawn out, with any part of the sensor optical fiber 6 being not cut, and guided into the casing 65 as an optical fiber code 67. The optical fiber code 67 is fixed at the entrance of the casing with a fastening element 68, and then divided into going and returning sheath stripped optical fiber 66 and fastened by Kevlar elements 69 in the casing 65.

In the casing 65, the optical fiber 66, in order to make it possible to detect an object smaller than the minimum detectable distance of the temperature distribution measuring system 2, is wound like "8" whose length is more than twice the minimum detectable distance and the optical fiber 66 is housed in the casing 65.

The optical fiber 66 is wound like an 8 and housed in the casing 65 in order that deformation such as bending and lateral pressure against an external force do not act on the optical fiber 66. Winding the optical fiber 66 like eight is important to prevent the twisting.

In other words, when the optical fiber is cut and coiled, it is possible not to twist the optical fiber during coiling. However, without cutting, as the optical fiber is coiled, the optical fiber is twisted by one rotation (360°) for one-turn-coiling so that the number of twists increases proportionally to the number of turns. On the other hand, if the optical fiber is wound like an 8, the optical fiber is twisted by 180° as it is turned half round in a direction but twisted by 180° as it is turned another half in the opposite direction, whereby the twist is counterbalanced and the number of twists does not increase.

An example will now be described where a QSI (Quasi-Step Index) type or GI (Graded Index) type optical fiber of 200/250 μm is used as the sensor optical fiber, the longitudinal length of the 8 is 140 mm, the transverse length of the 8 is 70 mm and the bending diameter is 40 mm.

Figure 44:
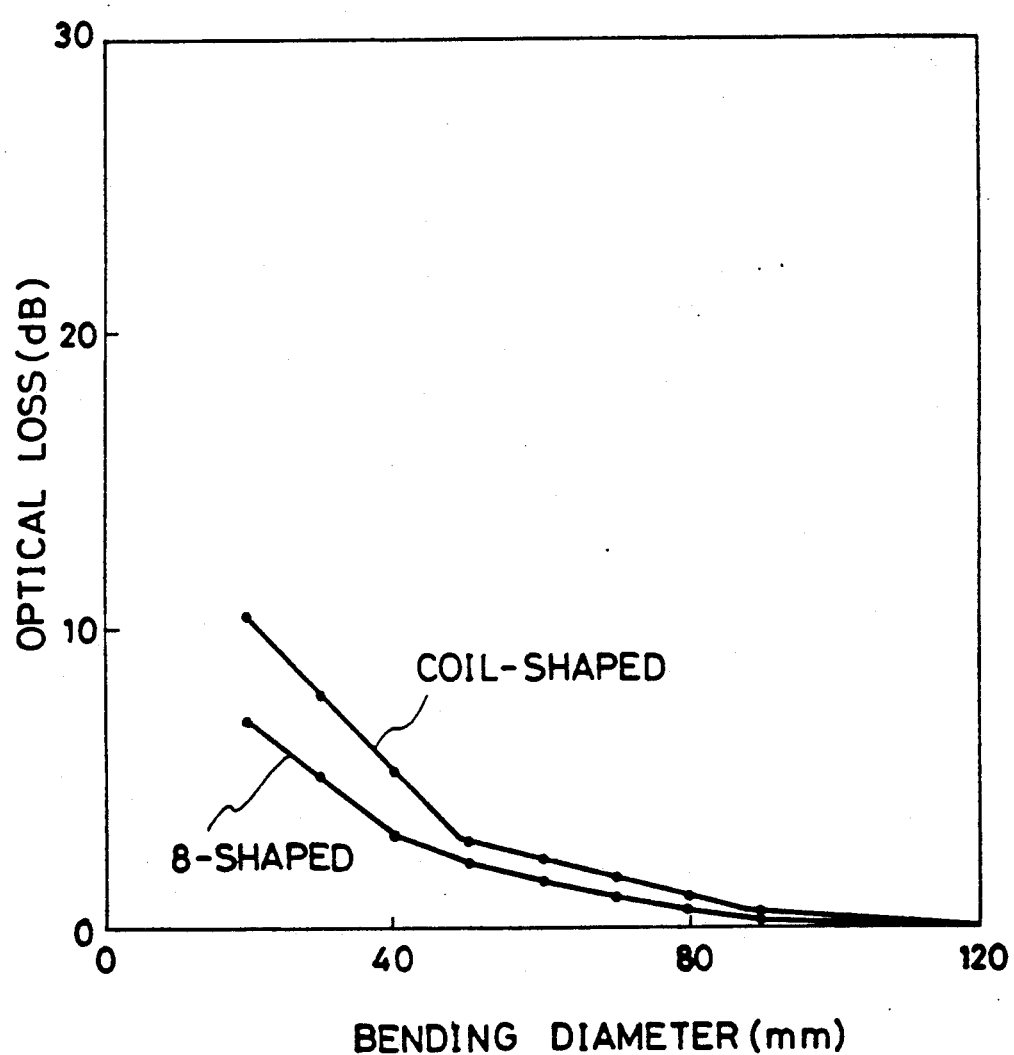
FIG. 44 is a diagram showing the twist effect in terms of a relation between a bending diameter and optical loss characteristics.

FIG. 44 shows a comparison of the bending loss when coiled like an oval and twist is contained and the bending loss when coiled like an 8, with the optical fiber length being constant (3 m). The number of coiling increases as the bending diameter becomes smaller, and then the twist increases and the loss increases. In this particular case (where the bending diameter is 40 mm), the optical loss is reduced by 0.1 dB by coiling the optical fiber in the shape of an eight. Therefore, it is possible to make the optical fiber length longer and the number of the sensors larger.

In the foregoing, the sensor optical fiber is merely housed in the casing. However, in consideration of the heat transfer property, the casing may be filled with a compound or oil.

What is claimed is:

1. An optical wavelength demultiplexing apparatus for receiving light having various components and for separating said light components, said apparatus comprising:
   (a) first filter means coupled to said received light, for reflecting a first and a second of said light components therefrom, said second light component comprising Stokes light;
   (b) second filter means optically coupled to said first filter means for receiving said reflected first and second components from said first filter means and for reflecting said received first light component while allowing said second received light component to pass therethrough; and
   (c) third filter means optically coupled to said second filter means for receiving said second light component passing through said second filter means and for reflecting said second light component, whereby said first and said second light components are separated from said light received by said first filter means.

2. The optical wavelength demultiplexing apparatus of claim 1, wherein said first light component comprises:
Anti-Stokes light.

3. An optical wavelength demultiplexing apparatus for receiving light having various components including a Rayleigh light component, and for separating said light components, said apparatus comprising:
   (a) first filter means coupled to said received light, for reflecting a first and a second of said light components therefrom;
   (b) band pass filter means, optically coupled to said first filter means, for separating said Rayleigh light component from said light before said light is received by said first filter means;
(c) second filter means optically coupled to said first filter means for receiving said reflected first and second components from said first filter means and for reflecting said received first light component while allowing said second received light component to pass therethrough; and
(d) third filter means optically coupled to said second filter means for receiving said second light component passing through said second filter means and for reflecting said second light component, whereby said first and said second light components are separated from said light received by said first filter means.

4. An optical wavelength demultiplexing apparatus for receiving light having various components and for separating said light components, said apparatus comprising:
(a) first filter means coupled to said received light, for reflecting a first and a second of said light components therefrom;
(b) second filter means optically coupled to said first filter means for receiving said reflected first and second components from said first filter means and for reflecting said received first light component while allowing said second received light component to pass therethrough;
(c) third filter means optically coupled to said second filter means for receiving said second light component passing through said second filter means and for reflecting said second light component, whereby said first and said second light components are separated from said light received by said first filter means; and
(d) fourth filter means optically coupled to said second filter means for receiving said reflected Stokes light component from said second filter means and for allowing this received stokes light component to pass therethrough.

5. The optical wavelength demultiplexing apparatus of claim 4, further comprising:
(e) fifth filter means optically coupled to said third filter means for receiving said reflected second light component from said third filter means and for allowing this received second light component to pass therethrough.

6. An optical wavelength demultiplexing apparatus for receiving light having both Stokes and Anti-Stokes light components and for separating both said Stokes and said Anti-Stokes light component from said received light, said apparatus comprising:
(a) first filter means coupled to said received light for reflecting both said Stokes and said Anti-Stokes light components therefrom;
(b) second filter means optically coupled to said first filter means for receiving and attenuatively reflecting said Stokes light components therefrom, said reflected Stokes light component being attenuated by a certain amount;
(c) third filter means optically coupled to said first filter means for receiving and attenuatively reflecting said Anti-Stokes light component therefrom, said Anti-Stokes light component being attenuated by an amount substantially equal to said certain amount.

7. The optical wavelength demultiplexing apparatus of claim 6, wherein said light received by said first filter means further includes a Rayleigh light component, said apparatus further comprising:
band pass filter means, optically coupled to said first filter means, for separating said Rayleigh light component from said light before said light is received by said first filter means.

8. The optical wavelength demultiplexing apparatus of claim 6, further comprising:
(d) fourth filter means optically coupled to said second filter means for receiving said reflected Stokes light component from said second filter means and for allowing this received stokes light component to pass therethrough.

9. The optical wavelength demultiplexing apparatus of claim 6, further comprising:
(e) fifth filter means optically coupled to said third filter means for receiving said reflected Anti-Stokes light component from said third filter means and for allowing this received anti-stokes light component to pass therethrough.

10. The optical wavelength demultiplexer of claim 6, wherein said first and said second filter means are separated by a certain distance and cooperatively define an optical axis therebetween, said optical axis specifying a direction along which said first filter means reflects said Stokes light component to said second filter means, said demultiplexer further comprising:
rotation means, coupled to said first and to said second filter means for simultaneously rotatably moving both said first and said second filter means while maintaining said optical axis constant.

11. The optical wavelength demultiplexer of claim 10, further comprising:
movement means, coupled to said first and to said second filter means, for moving one of said first and said second filter means with respect to the other so as to change said distance of separation while maintaining said optical axis constant.

* * * * *